US012770069B2

(12) United States Patent
Dennis et al.

(10) Patent No.: US 12,770,069 B2
(45) Date of Patent: Oct. 20, 2026

(54) AUTONOMOUS VEHICLE USER ASSIGNMENT MANAGEMENT

(71) Applicant: Uber Technologies, Inc., San Francisco, CA (US)

(72) Inventors: Benjamin Patrick Dennis, San Francisco, CA (US); Reed Sierra Horton, San Francisco, CA (US)

(73) Assignee: Uber Technologies, Inc., San Francisco, CA (US)

(*) Notice: Subject to any disclaimer, the term of this patent is extended or adjusted under 35 U.S.C. 154(b) by 0 days.

(21) Appl. No.: 19/068,915

(22) Filed: Mar. 3, 2025

(65) Prior Publication Data

US 2026/0030562 A1 Jan. 29, 2026

Related U.S. Application Data

(60) Provisional application No. 63/660,730, filed on Jun. 17, 2024.

(51) Int. Cl.
*G06Q 10/02* (2012.01)
*B60W 60/00* (2020.01)
(Continued)

(52) U.S. Cl.
CPC ....... *G06Q 10/02* (2013.01); *B60W 60/00253* (2020.02); *G06Q 30/0282* (2013.01); *G06Q 50/47* (2024.01); *B60W 2556/10* (2020.02)

(58) Field of Classification Search
CPC ............. G06Q 10/025; G06Q 2240/00; G06Q 10/083; G06Q 50/47
(Continued)

(56) References Cited

U.S. PATENT DOCUMENTS 9,940,651 B2 * 4/2018 Ross .................... G05D 1/0217
11,488,276 B2 * 11/2022 Lye ........................ G06Q 30/06
(Continued)

OTHER PUBLICATIONS

"Requesting More Than One Uber at a Time: Is it Possible?" by Nicole Levine, Oct. 25, 2022 (Year: 2022).*
(Continued)

*Primary Examiner* — Jeff Zimmerman
*Assistant Examiner* — Brian Adams Heflin
(74) *Attorney, Agent, or Firm* — Schwegman Lundberg & Woessner, P.A.

(57) ABSTRACT

Systems and methods herein describe an autonomous vehicle user assignment management system for improving fleet vehicle utilization. The method comprises receiving a first transportation service request from a user device, matching a first autonomous vehicle to fulfill the request, and displaying a permission request for autonomous transportation services on the user device. Upon obtaining user permission, the first autonomous vehicle is instructed to provide the transportation service. When a subsequent transportation service request is received from the same user device, a second autonomous vehicle is matched to provide the service, but the permission request is omitted based on the previously obtained consent. The second autonomous vehicle is then instructed to begin providing the transportation service without requiring additional user permission, thereby reducing user interaction friction and improving operational efficiency in autonomous vehicle fleet management.

20 Claims, 14 Drawing Sheets

(51) Int. Cl.
*G06Q 30/0282* (2023.01)
*G06Q 50/47* (2024.01)

(58) Field of Classification Search
USPC .......................................................... 705/5, 6
See application file for complete search history.

(56) References Cited

U.S. PATENT DOCUMENTS

| | | | | |
|---|---|---|---|---|
| 11,541,843 | B1 * | 1/2023 | Stoffel | G07C 9/00857 |
| 2017/0011324 | A1 * | 1/2017 | Truong | G06Q 50/60 |
| 2019/0244318 | A1 * | 8/2019 | Rajcok | H04W 4/40 |
| 2022/0065638 | A1 * | 3/2022 | Goldman | G01C 21/3453 |
| 2022/0164910 | A1 * | 5/2022 | Gu | G06Q 50/40 |
| 2023/0082825 | A1 * | 3/2023 | Gerrese | G06Q 10/1093 705/7.19 |
| 2025/0109948 | A1 * | 4/2025 | Konduru | G01C 21/3415 |

OTHER PUBLICATIONS

"Careem app features you must consider:101 guide," by AppsRhino, Apr. 25, 2024 (Year: 2024).*
"Waymo Adds Advance Booking Option for Autonomous Rides," by Nehal Malik, Sep. 2, 2025 (Year: 2025).*
"Use Case of CMachine Leaning," by Swati Kumari, Jul. 1, 2023 (Year: 2023).*
"Using Machine Leaning to Build a Ride Acceptance Model for Uber," by Shaurya Uppal, Aug. 16, 2022 (Year: 2022).*

* cited by examiner

AUTONOMOUS VEHICLE USER ASSIGNMENT MANAGEMENT

CROSS-REFERENCE

This application is a non-provisional application claiming priority to a U.S. Provisional Patent Application Ser. No. 63/660,730, filed on Jun. 17, 2024. The contents of this prior application are considered part of this application and are hereby incorporated by reference in its entirety.

An autonomous vehicle (AV) is a vehicle that is capable of sensing its environment and operating some or all of the vehicle's controls based on the sensed environment. An AV includes sensors that capture signals describing the environment surrounding the vehicle. The AV processes the captured sensor signals to comprehend the environment and automatically operates some or all of the vehicle's controls based on the resulting information.

BRIEF SUMMARY

A method for improving utilization of a fleet of vehicles involves receiving a first request for a first transportation service from a user device associated with a user; matching a first autonomous vehicle to provide the first transportation service to the user; after the matching the first autonomous vehicle, causing display, on the user device, of a request for permission to provide autonomous transportation services; determining the permission is obtained from the user; after determining that the permission is obtained from the user, instructing the first autonomous vehicle to begin providing the first transportation service; receiving a second request for a second transportation service from the user device; matching a second autonomous vehicle to provide the second transportation service to the user; determining to omit causing the display, on the user device, of the request for permission to provide the autonomous transportation services; and instructing the second autonomous vehicle to begin providing the second transportation service.

In some embodiments, a computing device that comprises a processor and a memory storing instructions that, when executed, configure the computing device to perform operations outlined in the method. In some embodiments, a non-transitory computer-readable storage medium, the non-transitory computer-readable storage medium including instructions that when executed by a computing device, cause the computing device to perform operations outlined in the method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced. In the drawings, which are not necessarily drawn to scale, like numerals may describe similar components in different views. Like numerals having different letter suffixes may represent different instances of similar components. Some embodiments are illustrated by way of example, and not of limitation, in the figures of the accompanying drawings.

DETAILED DESCRIPTION

Figure 1:
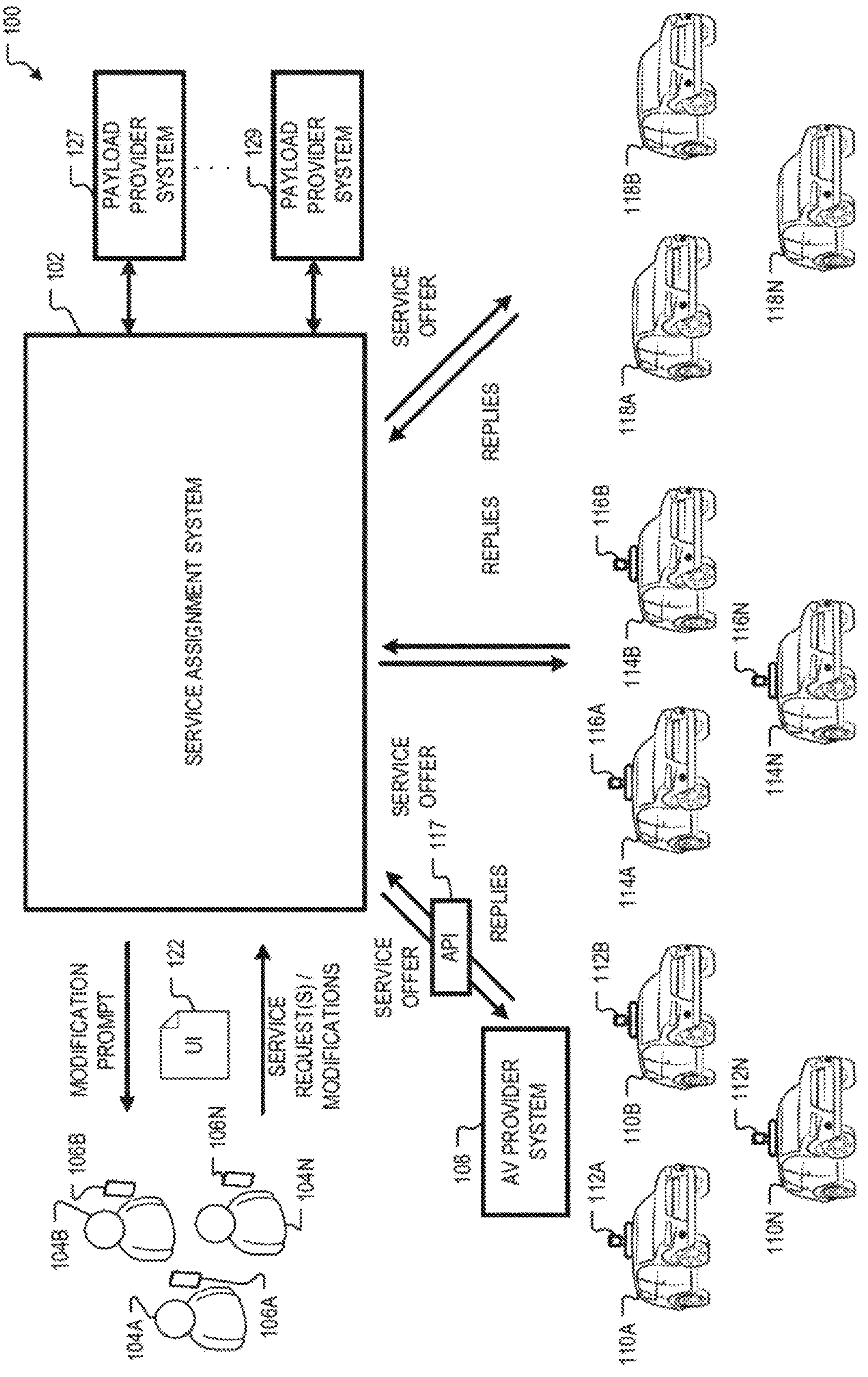
FIG. 1 is a diagram showing one example of an environment for managing a mixed fleet of vehicles using a service assignment system, according to some examples.

Examples described herein are directed to systems and methods for using a computing system to manage and/or operate one or more fleets of vehicles to execute transportation services, where the fleet or fleets include autonomous vehicles (AVs).

In an autonomous or semi-autonomous vehicle (collectively referred to as an AV), a vehicle autonomy system, sometimes referred to as an AV stack, controls one or more of braking, steering, or throttle of the vehicle. In a fully autonomous vehicle, the vehicle autonomy system assumes full control of the vehicle. In a semi-autonomous vehicle, the vehicle autonomy system assumes a portion of the vehicle control, with a human user (e.g., a vehicle operator) still providing some control input. Some autonomous vehicles can also operate in a manual mode, in which a human user provides all control inputs to the vehicle.

An autonomous transportation service refers to a transportation service executed by an autonomous vehicle. When providing autonomous transportation services, an autonomous vehicle may primarily be controlled by the vehicle autonomy system rather than by a human driver. In some examples, the autonomous vehicle providing the autonomous transportation service may be monitored, supervised, or subject to intervention by a human. Autonomous transportation services are distinct from transportation services provided by human-driven vehicles. A human-driven vehicle may be driven by a human driver, who exercises direct or physical control over the acceleration, steering, braking, or navigational decisions of the human-driven vehicle. A transportation service provided by a human-driven vehicle is one in which the human driver exercises control over the vehicle's acceleration, steering, braking, or navigational decisions for the duration of the transportation service.

In some examples, a service assignment system receives requests for transportation services from one or more users. A transportation service may include transporting a payload, such as cargo and/or one or more passengers, from a service start location (e.g., a pickup location) to a service end location. Examples of cargo can include food, packages, and/or the like. The service assignment system may match received requests for transportation services from users with vehicles from the mixed fleet that includes both human-driven vehicles and autonomous vehicles. When the service assignment system selects a vehicle for a requested transportation service, the service assignment system may report the request for transportation service to the vehicle and/or to an AV provider system managing the vehicle.

When AVs are used to fulfill requests for transportation services, additional complications may arise. For example, some users may be skeptical of AVs and may prefer transportation services executed by human-driven vehicles. Other users may be more enthusiastic about AVs and may be eager for transportation services executed by AVs. Still other users may lack strong opinions about autonomous transportation services but may prefer a simplified service request process. Also, in some examples, users' AV-related preferences may change from trip to trip, for example, depending on whether the user is in a hurry.

Differences in user enthusiasm towards autonomous transportation services may affect AV utilization. For example, operating the AV in the most efficient manner may include maximizing the utilization of the AV. If users are automatically matched with an AV without having the user specifically consent to an AV via a permission obtaining process, some may cancel the transportation service upon realizing that an AV will provide the transportation or when the AV arrives to fulfill the transportation service. This reduces the efficiency of the AV because it occupies the AV's time and also prompts the AV to travel for a transportation service that it does not ultimately execute.

Differences in user enthusiasm toward AV services may also affect the hardware resources used to implement a service assignment system. For example, if the service assignment system obtains user consent or authorization each time the user is matched to an AV for a transportation service, it will increase the network usage of both the service assignment system and the users' personal computing devices. Further, prompting the user to consent to an AV match may lengthen the matching process for every user and also burden the service assignment system with additional calculations and processes.

To facilitate user preferences, it is sometimes desirable for a service assignment system to request for permission from the user when a user has been matched to an AV. For example, the service assignment system may provide to the user an indication that the user has been matched with an AV. The user may be provided with an opportunity to accept (e.g., giving permission to autonomous transportation services) or decline the match. When the user accepts the match, the service assignment system may instruct the matched AV to begin executing the transportation service. When the user declines the match, the service assignment system may re-match the user to a different vehicle, such as a human-driven vehicle.

In some examples, the utilization of the AV may be improved with the permission obtaining process. For example, after a user has been matched to an AV and the AV (or its associated provider system) has accepted a request for transportation service, the service assignment system may cause the user computing device to display an offer card to the user. The offer card may act as a request for permission, which may indicate that the user has been matched to an AV and allow the user to either accept or decline the match. When the user accepts the match, the service assignment system may instruct the matched AV to begin executing the transportation service. When the user declines the match, the service assignment system may re-match the user to a different vehicle, such as a human-driven vehicle.

Systems utilizing the permission obtaining process may still result in inefficiencies and less than optimal utilizations for AVs. For example, the AV may not be free to accept additional offers between the time that the AV or associated provider system accepts a request for transportation service and the time that a user either accepts or declines the transportation service. Accordingly, the AV may be idle until the user either gives permission or declines the match. If the AV does choose to begin moving towards a pickup location for the user, it risks additional inefficiencies if the user declines the autonomous transportation service.

The permission obtaining process may also negatively affect the experience of users. For example, some users may mistakenly decline an autonomous transportation service when they intend to accept it. Also, for example, the permission obtaining process may introduce additional steps into the users' transportation service process, which may cause the trip to take longer and may also frustrate the user.

These and other challenges may be addressed by utilizing user AV auto-accept, AV default-accept, or AV prioritization. A user may have a set of preferences maintained by the service assignment system. The service assignment system may be configured to maintain an AV auto-accept user preference. When the AV auto-accept user preference is set to true, the service assignment system may either omit the request for permission to provide autonomous transportation services (e.g., omit causing display of the offer card) or automatically accept autonomous transportation service when the user is matched with an AV. The service assignment system may also maintain a AV default-accept preference for users. With the AV default-accept preference enabled, the service assignment system may automatically authorize autonomous transportation services if the user does not respond to a displayed permission request or offer card after an elapse of a predetermined length of time. The user may also have an AV prioritization preference. The AV prioritization preference may determine the likelihood that a user is matched to an AV. Users who are enthusiastic about autonomous vehicles may have an AV prioritization preference set to increase the likelihood that the user is matched to an AV and a request for permission for these users is omitted.

In various examples, the service assignment system may prompt a user to set an AV auto-accept preference or an AV prioritization preference based on user behavior. For example, the user may be prompted to set an AV auto-accept preference or an AV prioritization preference after the user has completed a transportation service executed by an autonomous vehicle. Also, for example, the user may be prompted to set an AV auto-accept preference or an AV prioritization preference after the user has completed a transportation service executed by an autonomous vehicle or provided a rating for the service that meets a rating threshold.

Also, in some examples, the service assignment system may automatically set an AV auto-accept preference or an AV prioritization preference for a user based on, for example, characteristics of the user, transportation service history of the user, the user's history of rating transportation services executed by AV's, and/or the like. In some examples, the service assignment system may set an AV prioritization preference for users who also have an AV auto-accept preference set.

In some examples, the service assignment system may determine to omit a request for permission (e.g., user consent or authorization) based on the user being a repeat rider when the user is matched to an AV for a transportation service. A repeat rider is someone who has completed at least one transportation service involving an AV. Therefore, this omission of the request for permission may reduce the network usage of both the service assignment system and the users' computing devices. Omitting the request for permission may also improve the utilization of a fleet of vehicles comprising autonomous vehicles because autonomous vehicles may proceed to a pickup location without having to wait for permission or expiration of the request for permission.

In this way, the utilization of AVs may be increased. For example, users with an AV prioritization preference may increase the likelihood of AV matches, while also decreasing the likelihood that an AV will be matched to a user who is inclined to decline autonomous transportation services. Also, for example, the service assignment system may match users with an AV auto-accept preference to AVs in a way that does not require the AV to wait for a user acceptance, thus reducing the risk of the AV wasting time when the user declines a transportation service and reducing the overall time that the AV spends on the transportation service. This may allow AVs to execute more transportation services in a given amount of time.

FIG. 1 is a diagram showing one example of an environment 100 for managing a mixed fleet of vehicles using a service assignment system 102, according to some examples. The environment 100 includes the service assignment system 102, a fleet of vehicles 110A, 110B, 110N, 114A, 114B, 114N, 118A, 118B, 118N, and users 104A, 104B, 104N. The fleet of vehicles may be a mixed fleet including AVs and human-driven vehicles. In this example, the fleet includes AVs 110A, 110B, 110N, 114A, 114B, 114N and human-driven vehicles 118A, 118B, 118N. Some or all of the vehicles 110A, 110B, 110N, 114A, 114B, 114N, 118A, 118B, 118N may be passenger vehicles, such as passenger trucks, cars, buses, or other similar vehicles. Also, some or all of the vehicles 110A, 110B, 110N, 114A, 114B, 114N, 118A, 118B, 118N may be delivery vehicles, such as vans, delivery trucks, delivery robots, tractor trailers, etc.

Figure 2:
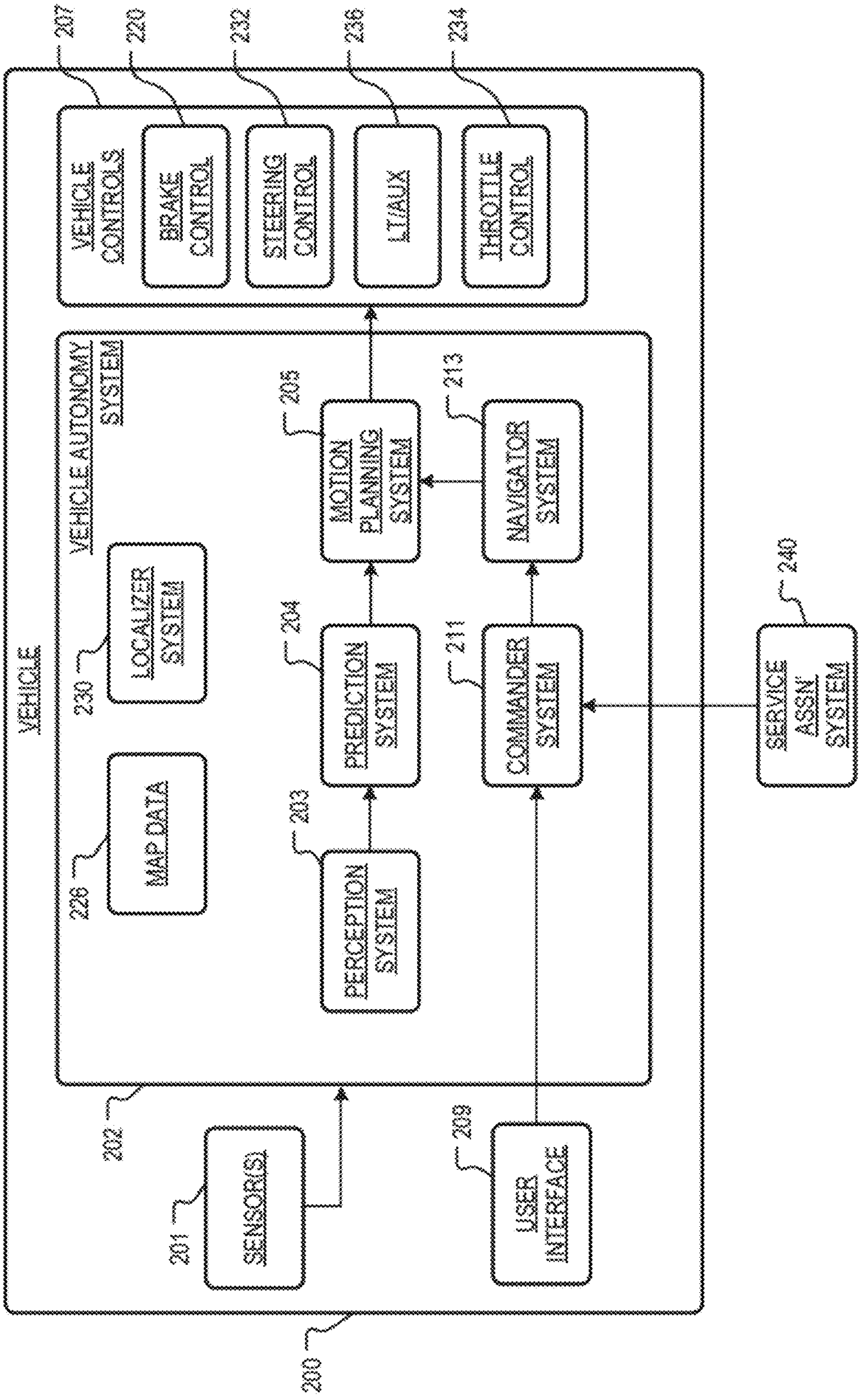
FIG. 2 is a block diagram illustrating an example vehicle, according to some examples.

In this example, the AVs 110A, 110B, 110N, 114A, 114B, 114N include respective vehicle autonomy systems, described in more detail with respect to FIG. 2. The vehicle autonomy systems are configured to operate some or all of the controls of the AVs 110A, 110B, 110N, 114A, 114B, 114N (e.g., acceleration, braking, steering). In some examples, one or more of the AVs 110A, 110B, 110N, 114A, 114B, 114N are operable in different modes, where the vehicle autonomy system has differing levels of control over the AV 110A, 110B, 110N, 114A, 114B, 114N. Some AVs 110A, 110B, 110N, 114A, 114B, 114N may be operable in a fully autonomous mode in which the vehicle autonomy system has responsibility for all or most of the controls of the AV 110A, 110B, 110N, 114A, 114B, 114N. Some AVs 110A, 110B, 110N, 114A, 114B, 114N are operable in a semiautonomous mode that is in addition to or instead of the fully autonomous mode. In a semiautonomous mode, the vehicle autonomy system of an AV 110A, 110B, 110N, 114A, 114B, 114N is responsible for some of the vehicle controls while a human user or driver is responsible for other vehicle controls. In some examples, one or more of the AVs 110A, 110B, 110N, 114A, 114B, 114N are operable in a manual mode in which the human user is responsible for all controls of the AV 110A, 110B, 110N, 114A, 114B, 114N.

The AVs 110A, 110B, 110N, 114A, 114B, 114N include one or more respective remote-detection sensor sets 112A, 112B, 112N, 116A, 116B, 116N. The remote-detection sensor sets 112A, 112B, 112N, 116A, 116B, 116N include one or more remote-detection sensors that receive signals from the environment 100. The signals may be emitted by and/or reflected from objects in the environment 100, such as the ground, buildings, trees, etc. The remote-detection sensor sets 112A, 112B, 112N, 116A, 116B, 116N may include one or more active sensors, such as light imaging detection and ranging (LIDAR) sensors, radio detection and ranging (RADAR) sensors, and/or sound navigation and ranging (SONAR) sensors, that emit sound or electromagnetic radiation in the form of light or radio waves to generate return signals. Information about the environment 100 is extracted from the received signals. In some examples, the remote-detection sensor sets 112A, 112B, 112N, 116A, 116B, 116N include one or more passive sensors that receive signals that originated from other sources of sound or electromagnetic radiation. The remote-detection sensor sets 112A, 112B, 112N, 116A, 116B, 116N provide remote-detection sensor data that describes the environment 100. The AVs 110A, 110B, 110N, 114A, 114B, 114N can also include other types of sensors, for example, as described in more detail with respect to FIG. 2.

In some examples, the AVs 110A, 110B, 110N, 114A, 114B, 114N are of different types. Different types of AVs may have different capabilities. For example, the different types of AVs 110A, 110B, 110N, 114A, 114B, 114N can have different vehicle autonomy systems. This can include, for example, vehicle autonomy systems made by different manufacturers or designers, vehicle autonomy systems having different software versions or revisions, etc. Also, in some examples, the different types of AVs 110A, 110B, 110N, 114A, 114B, 114N can have different remote-detection sensor sets 112A, 112B, 112N, 116A, 116B, 116N. For example, one type of AV 110A, 110B, 110N, 114A, 114B, 114N may include a LIDAR remote-detection sensor, while another type may include stereoscopic cameras and omit a LIDAR remote-detection sensor. In some examples, different types of AVs 110A, 110B, 110N, 114A, 114B, 114N can also have different mechanical particulars. For example, one type of vehicle may have all-wheel drive, while another type may have front-wheel drive, etc.

In the example of FIG. 1, the AVs 110A, 110B, 110N are managed by an AV provider system 108. The AV provider system 108 may be implemented by an entity that manages or otherwise operates the AVs 110A, 110B, 110N. The AV provider system 108 may communicate the requests for transportation services to the respective AVs 110A, 110B, 110N. Replies to the requests for transportation services (e.g., messages accepting and/or declining the request for transportation service) may be sent from the AV provider system 108 to the service assignment system 102. In some examples, the AV provider system 108 may accept and/or decline a request for transportation service on behalf of one or more of the AVs 110A, 110B, 110N. Also, in some examples, the service assignment system 102 may direct a request for transportation service to the AV provider system 108 instead of directly to one or more of the AVs 110A, 110B, 110N. The AV provider system 108 may select and AV 110A, 110B, 110N to perform the requested transportation service. Although one AV provider system 108 and associated AVs 110A, 110B, 110N are shown in FIG. 1, it will be appreciated that other examples of the environment may include multiple AV provider systems and associated AVs.

In some examples, communication between the service assignment system 102 and one or more AV provider systems 108 is performed by an application programming interface (API) such as API 117. For example, requests for transportation services from the service assignment system 102 to the AV provider system 108 or directly to one or more of the AVs 110A, 110B, 110N using one or more calls by the service assignment system 102 and/or by the user computing device 106 to the API 117. Similarly, replies from the AV provider system 108 to the service assignment system 102 may involve one or more calls to the API 117 by the AV provider system 108 or the service assignment system 102. For example, the AV provider system 108 may reply to a request for transportation service by accepting the request or declining the request. Also, although a single API 117 is shown in FIG. 1, it will be appreciated that some arrangements may include multiple APIs for managing communications between the AV provider system 108 and the service assignment system 102. For example, different APIs may be used for different communication tasks.

In some examples, the service assignment system 102 may communicate directly with AVs 114A, 114B, 114N (e.g., not through an AV provider system 108). For example, the service assignment system 102 may communicate requests for transportation services to AVs 114A, 114B, 114N and receive replies directly from the AVs 114A, 114B, 114N. The AVs 114A, 114B, 114N with which the service assignment system 102 communicates directly may be operated and/or managed by a third-party AV provider and/or by the entity implementing the service assignment system 102.

In the example of FIG. 1, the service assignment system 102 also communicates with human-driven vehicles 118A, 118B, 118N, for example, to communicate requests for transportation services or receive replies. The service assignment system 102 may communicate with the vehicles 118A, 118B, 118N themselves (e.g., through an infotainment system or other suitable computing system of the vehicle) and/or with one or more of the human drivers of the vehicles 118A, 118B, 118N (e.g., via a user computing device or devices of the human drivers). It will be appreciated that FIG. 1 shows just one example of a mixed fleet and that different mixed fleets may have different numbers and proportions of AVs and human-driven vehicles.

The service assignment system 102 is programmed to receive requests for transportation services from the users 104A, 104B, 104N and to communicate the requests for transportation services to vehicles selected from the fleet of vehicles 110A, 110B, 110N, 114A, 114B, 114N, 118A, 118B, 118N as described herein. The service assignment system 102 can be or include one or more servers or other suitable computing devices. The service assignment system 102 is configured to receive requests for transportation services from one or more users 104A, 104B, 104N. The users 104A, 104B, 104N make requests for transportation services with user computing devices 106 (e.g., user computing device 106A, 106B, 106N.) The user computing devices 106A, 106B, 106N can be or include any suitable computing device such as, for example, tablet computers, mobile telephone devices, laptop computers, desktop computers, etc. In some examples, the user computing devices 106A, 106B, 106N execute an application associated with a transportation service implemented with the service assignment system 102. The users 104A, 104B, 104N launch the application on the respective user computing devices 106A, 106B, 106N and utilize functionality of the application to make requests for transportation services. A user computing device 106 may be referred to as a user device.

The service assignment system 102 is programmed to receive and process requests for transportation services from users 104A, 104B, 104N. In response to receiving a request for transportation service, the service assignment system 102 may filter the fleet of vehicles 110A, 110B, 110N, 114A, 114B, 114N, 118A, 118B, 118N to select a set of one or more candidate vehicles. The set of candidate vehicles may include vehicles that are suitable, or potentially suitable, for executing the requested transportation service. From the set of candidate vehicles, the service assignment system 102 may communicate the request for transportation service to a selected vehicle or vehicles, which may be selected by the service assignment system 102 based on any suitable criterion or criteria such as, for example, vehicle status, vehicle locations, vehicle cost to execute the requested transportation service, a prior acceptance rate of the vehicle and/or of vehicles of the same time, etc. In some examples, the service assignment system 102 selects a vehicle or vehicles to offer a transportation service using a route for the transportation service, which may be generated by the service assignment system 102, by the AV provider system 108, and/or by any other suitable component of the environment 100.

The service assignment system 102 may select the set of candidate vehicles based on various criteria such as, for example, the availability of the various vehicles in the fleet, properties of the request for transportation service, user preferences, vehicle status, and/or the like. Properties of the request for transportation service may include, for example, the service start location, the service end location, the type of payload (e.g., size and weight of payload, number of passengers, etc.).

In some examples, the service assignment system 102 may report a transportation service to an AV provider system 108. For example, the service assignment system 102 may query the AV provider system 108 to receive a description of parameters describing how one or more of the AVs 110A, 110B, 110N managed by the AV provider system 108 could perform a route associated with the requested transportation service. The parameters provided by the AV provider system 108 may include, for example, the availability of one or more of the AVs 110A, 110B, 110N (e.g., vehicle status), properties of the request for transportation service, user preferences, and/or the like.

If the parameters provided by the AV provider system 108 are acceptable, the service assignment system 102 may offer the transportation service to the AV provider system 108. The AV provider system 108 may distribute the requested transportation service for execution by one or more of the AVs 110A, 110B, 110N managed by the AV provider system 108.

In some examples, the service assignment system 102 provides a user interface (UI) 122 to the users 104A, 104B, 104N via the respective user computing devices 106A, 106B, 106N. The UI 122 may provide functionality allowing the users to make requests for transportation services. For example, the UI 122 may include fields in which a user computing devices 106A, 106B, or 106N can provide request properties such as, for example, a service start location, a service end location, a description of the desired payload, and/or the like.

In some examples, a user 104A, 104B, 104N may request a transportation service that involves the delivery of a product, where the product is all or part of the payload of the transportation service. For example, a user 104A, 104B, 104N may request delivery of a meal from a restaurant or other provider, a delivery of a purchase from a store or other provider. In some examples, the service assignment system 102 is in communication with one or more payload provider systems 127, 129. Payload provider systems 127, 129 are associated with restaurants, stores, or other entities that provide payloads for transportation services, for example, where the payloads are delivered to the service end location.

In some examples, the UI 122 includes information about payload that can be provided by a payload provider system 127, 129. Consider an example in which a transportation service is to deliver prepared food via a payload provider system 127, 129. The UI 122 may include fields allowing the user 104A, 104B to select the payload provider system 127, 129 and/or items from the menu of the payload provider system 127, 129 for delivery. The properties of the request for transportation service, then, can include the identified payload. When a vehicle and/or user computing device 106 accepts the requested transportation service, the service assignment system 102 may provide an instruction to the selected payload provider system 127, 129 requesting preparation of the payload and providing information about the vehicle that will pick up the payload for delivery.

The example environment 100 describes a mixed fleet including AVs 110A, 110B, 110N managed by the AV provider system 108, AVs managed by the service assignment system 102 and human-driven vehicles 118A, 118B, 118N. It will be appreciated, however, that in various examples, the environment 100 may include more or fewer different types of vehicles. For example, in some arrangements, the service assignment system 102 may communicate requests for transportation services to multiple third-party fleets of autonomous vehicles via multiple AV provider systems (e.g., and multiple APIs or API instances). In other examples, some or all of the vehicle types shown in the environment 100 be omitted. For example, the service assignment system 102 may be configured to offer service assignments only to autonomous vehicles or only to autonomous vehicles managed by AV provider systems, or permutations thereof.

FIG. 2 is a block diagram illustrating an example vehicle 200, according to some examples. The vehicle 200 shows one example arrangement of the AVs 110A, 110B, 110N, 114A, 114B, 114N of FIG. 1. The vehicle 200 includes one or more sensors 201, a vehicle autonomy system 202, and one or more vehicle controls 207. The vehicle 200 is an autonomous vehicle, as described herein. The example vehicle 200 shows just one example arrangement of an autonomous vehicle. In some examples, autonomous vehicles of different types can have different arrangements.

The vehicle autonomy system 202 includes a commander system 211, a navigator system 213, a perception system 203, a prediction system 204, a motion planning system 205, and a localizer system 230 that cooperate to perceive the surrounding environment of the vehicle 200 and determine a motion plan for controlling the motion of the vehicle 200 accordingly.

The vehicle autonomy system 202 is engaged to control the vehicle 200 or to assist in controlling the vehicle 200. In particular, the vehicle autonomy system 202 receives sensor data from the one or more sensors 201, attempts to comprehend the environment surrounding the vehicle 200 by performing various processing techniques on data collected by the sensors 201, and generates an appropriate route through the environment. The vehicle autonomy system 202 sends commands to control the one or more vehicle controls 207 to operate the vehicle 200 according to the route.

Various portions of the vehicle autonomy system 202 receive sensor data from the one or more sensors 201. For example, the sensors 201 may include remote-detection sensors as well as motion sensors such as an inertial measurement unit (IMU), one or more encoders, or one or more odometers. The sensor data includes information that describes the location of objects within the surrounding environment of the vehicle 200, information that describes the motion of the vehicle 200, etc.

The sensors 201 may also include one or more remote-detection sensors or sensor systems, such as a LIDAR system, a RADAR system, one or more cameras, etc. As one example, a LIDAR system of the one or more sensors 201 generates sensor data (e.g., remote-detection sensor data) that includes the location (e.g., in three-dimensional space relative to the LIDAR system) of a number of points that correspond to objects that have reflected a ranging laser. For example, the LIDAR system measures distances by measuring the Time of Flight (TOF) that it takes a short laser pulse to travel from the sensor to an object and back, calculating the distance from the known speed of light.

As another example, a RADAR system of the one or more sensors 201 generates sensor data (e.g., remote-detection sensor data) that includes the location (e.g., in three-dimensional space relative to the RADAR system) of a number of points that correspond to objects that have reflected ranging radio waves. For example, radio waves (e.g., pulsed or continuous) transmitted by the RADAR system reflect off an object and return to a receiver of the RADAR system, giving information about the object's location and speed. Thus, a RADAR system provides useful information about the current speed of an object.

As yet another example, one or more cameras of the one or more sensors 201 may generate sensor data (e.g., remote-detection sensor data) including still or moving images. Various processing techniques (e.g., range imaging techniques such as structure from motion, structured light, stereo triangulation, and/or other techniques) can be performed to identify the location (e.g., in three-dimensional space relative to the one or more cameras) of a number of points that correspond to objects that are depicted in an image or images captured by the one or more cameras. Other sensor systems can identify the location of points that correspond to objects as well.

As another example, the one or more sensors 201 can include a positioning system. The positioning system determines a current position of the vehicle 200. The positioning system can be any device or circuitry for analyzing the position of the vehicle 200. For example, the positioning system can determine a position by using one or more of inertial sensors, a satellite positioning system such as the Global Positioning System (GPS), a positioning system based on IP address, triangulation and/or proximity to network access points or other network components (e.g., cellular towers, Wi-Fi access points), and/or other suitable techniques. The position of the vehicle 200 can be used by various systems of the vehicle autonomy system 202.

Thus, the one or more sensors 201 are used to collect sensor data that includes information that describes the location (e.g., in three-dimensional space relative to the vehicle 200) of points that correspond to objects within the surrounding environment of the vehicle 200. In some implementations, the sensors 201 can be positioned at different locations on the vehicle 200. As an example, in some implementations, one or more cameras and/or LIDAR sensors can be located in a pod or other structure that is mounted on a roof of the vehicle 200, while one or more RADAR sensors can be located in or behind the front and/or rear bumper(s) or body panel(s) of the vehicle 200. As another example, one or more cameras can be located at the front or rear bumper(s) of the vehicle 200. Other locations can be used as well.

The localizer system 230 receives some or all of the sensor data from the sensors 201 and generates vehicle poses for the vehicle 200. A vehicle pose describes a position and attitude of the vehicle 200. The vehicle pose (or portions thereof) can be used by various other components of the vehicle autonomy system 202 including, for example, the perception system 203, the prediction system 204, the motion planning system 205, and the navigator system 213.

The position of the vehicle 200 is a point in a three-dimensional space. In some examples, the position is described by values for a set of Cartesian coordinates, although any other suitable coordinate system may be used. The attitude of the vehicle 200 generally describes the way in which the vehicle 200 is oriented at its position. In some examples, attitude is described by a yaw about the vertical axis, a pitch about a first horizontal axis, and a roll about a second horizontal axis. In some examples, the localizer system 230 generates vehicle poses periodically (e.g., every second, every half second). The localizer system 230 appends time stamps to vehicle poses, where the time stamp for a pose indicates the point in time that is described by the pose. The localizer system 230 generates vehicle poses by comparing sensor data (e.g., remote-detection sensor data) to map data 226 describing the surrounding environment of the vehicle 200.

In some examples, the localizer system 230 includes one or more pose estimators and a pose filter. Pose estimators generate pose estimates by comparing remote-detection sensor data (e.g., LIDAR, RADAR) to map data. The pose filter receives pose estimates from the one or more pose estimators as well as other sensor data such as, for example, motion sensor data from an IMU, encoder, or odometer. In some examples, the pose filter executes a Kalman filter or machine learning algorithm to combine pose estimates from the one or more pose estimators with motion sensor data to generate vehicle poses. In some examples, pose estimators generate pose estimates at a frequency less than the frequency at which the localizer system 230 generates vehicle poses. Accordingly, the pose filter generates some vehicle poses by extrapolating from a previous pose estimate utilizing motion sensor data.

Vehicle poses and/or vehicle positions generated by the localizer system 230 are provided to various other components of the vehicle autonomy system 202. For example, the commander system 211 may utilize a vehicle position to determine whether to respond to a call from a service assignment system 240.

The commander system 211 determines a set of one or more target locations that are used for routing the vehicle 200. The target locations are determined based on user input received via a user interface 209 of the vehicle 200. The user interface 209 may include and/or use any suitable input/output device or devices. In some examples, the commander system 211 determines the one or more target locations considering data received from the service assignment system 240. The service assignment system 240 is programmed to provide instructions to multiple vehicles, for example, as part of a fleet of vehicles for moving passengers and/or cargo. Data from the service assignment system 240 can be provided via a wireless network, for example.

The navigator system 213 receives one or more target locations from the commander system 211 and map data 226. The map data 226, for example, provides detailed information about the surrounding environment of the vehicle 200. The map data 226 provides information regarding identity and location of different roadways and roadway elements. A roadway is a place where the vehicle 200 can drive and may include, for example, a road, a street, a highway, a lane, a parking lot, or a driveway. Routing graph data is a type of map data 226.

From the one or more target locations and the map data 226, the navigator system 213 generates route data describing a route for the vehicle 200 to take to arrive at the one or more target locations. In some implementations, the navigator system 213 determines route data using one or more path-planning algorithms based on costs for graph elements/corresponding roadway elements, as described herein. For example, a cost for a route can indicate a time of travel, risk of danger, or other factor associated with adhering to a particular proposed route. Route data describing a route is provided to the motion planning system 205, which commands the vehicle controls 207 to implement the route or route extension, as described herein. The navigator system 213 can generate routes as described herein using a general-purpose routing graph and routing graph modification data. Also, in examples where route data is received from the service assignment system 240, that route data can also be provided to the motion planning system 205.

The perception system 203 detects objects in the surrounding environment of the vehicle 200 based on sensor 201 data, the map data 226, and/or vehicle poses provided by the localizer system 230. For example, the map data 226 used by the perception system 203 describes roadways and segments thereof and may also describe buildings or other items or objects (e.g., lampposts, crosswalks, curbing); location and directions of traffic lanes or lane segments (e.g., the location and direction of a parking lane, a turning lane, a bicycle lane, or other lanes within a particular roadway); traffic control data (e.g., the location and instructions of signage, traffic lights, or other traffic control devices); and/or any other map data that provides information that assists the vehicle autonomy system 202 in comprehending and perceiving its surrounding environment and its relationship thereto.

In some examples, the perception system 203 determines state data for one or more of the objects in the surrounding environment of the vehicle 200. State data describes a current state of an object (also referred to as features of the object). The state data for each object describes, for example, an estimate of the object's current location (also referred to as position); current speed (also referred to as velocity); current acceleration; current heading; current orientation; size/shape/footprint (e.g., as represented by a bounding shape such as a bounding polygon or polyhedron); type/class (e.g., vehicle, pedestrian, bicycle, or other); yaw rate; distance from the vehicle 200; minimum path to interaction with the vehicle 200; minimum time duration to interaction with the vehicle 200; and/or other state information.

In some implementations, the perception system 203 determines state data for each object over a number of iterations. In particular, the perception system 203 updates the state data for each object at each iteration. Thus, the perception system 203 detects and tracks objects, such as other vehicles, that are proximate to the vehicle 200 over time.

The prediction system 204 is configured to predict one or more future positions for an object or objects in the environment surrounding the vehicle 200 (e.g., an object or objects detected by the perception system 203). The prediction system 204 generates prediction data associated with one or more of the objects detected by the perception system 203. In some examples, the prediction system 204 generates prediction data describing each of the respective objects detected by the perception system 203.

Prediction data for an object is indicative of one or more predicted future locations of the object. For example, the prediction system 204 may predict where the object will be located within the next 5 seconds, 30 seconds, 200 seconds, etc. Prediction data for an object may indicate a predicted trajectory (e.g., predicted path) for the object within the surrounding environment of the vehicle 200. For example, the predicted trajectory (e.g., path) can indicate a path along which the respective object is predicted to travel over time (and/or the speed at which the object is predicted to travel along the predicted path). The prediction system 204 generates prediction data for an object, for example, based on state data generated by the perception system 203. In some examples, the prediction system 204 also considers one or more vehicle poses generated by the localizer system 230 and/or map data 226.

In some examples, the prediction system 204 uses state data indicative of an object type or classification to predict a trajectory for the object. As an example, the prediction system 204 can use state data provided by the perception system 203 to determine that a particular object (e.g., an object classified as a vehicle) approaching an intersection and maneuvering into a left-turn lane intends to turn left. In such a situation, the prediction system 204 predicts a trajectory (e.g., path) corresponding to a left turn for the vehicle such that the vehicle turns left at the intersection. Similarly, the prediction system 204 determines predicted trajectories for other objects, such as bicycles, pedestrians, parked vehicles, etc. The prediction system 204 provides the predicted trajectories associated with the object(s) to the motion planning system 205.

In some implementations, the prediction system 204 is a goal-oriented prediction system 204 that generates one or more potential goals, selects one or more of the most likely potential goals, and develops one or more trajectories by which the object can achieve the one or more selected goals. For example, the prediction system 204 can include a scenario generation system that generates and/or scores the one or more goals for an object, and a scenario development system that determines the one or more trajectories by which the object can achieve the goals. In some implementations, the prediction system 204 can include a machine-learned goal-scoring model, a machine-learned trajectory development model, and/or other machine-learned models.

The motion planning system 205 commands the vehicle controls 207 based at least in part on the predicted trajectories associated with the objects within the surrounding environment of the vehicle 200, the state data for the objects provided by the perception system 203, vehicle poses provided by the localizer system 230, the map data 226, and route or route extension data provided by the navigator system 213. Stated differently, given information about the current locations of objects and/or predicted trajectories of objects within the surrounding environment of the vehicle 200, the motion planning system 205 determines control commands for the vehicle 200 that best navigate the vehicle 200 along the route or route extension relative to the objects at such locations and their predicted trajectories on acceptable roadways.

In some implementations, the motion planning system 205 can also evaluate one or more cost functions and/or one or more reward functions for each of one or more candidate control commands or sets of control commands for the vehicle 200. Thus, given information about the current locations and/or predicted future locations/trajectories of objects, the motion planning system 205 can determine a total cost (e.g., a sum of the cost(s) and/or reward(s) provided by the cost function(s) and/or reward function(s)) of adhering to a particular candidate control command or set of control commands. The motion planning system 205 can select or determine a control command or set of control commands for the vehicle 200 based at least in part on the cost function(s) and the reward function(s). For example, the motion plan that minimizes the total cost can be selected or otherwise determined.

In some implementations, the motion planning system 205 can be configured to iteratively update the route or route extension for the vehicle 200 as new sensor data is obtained from the one or more sensors 201. For example, as new sensor data is obtained from the one or more sensors 201, the sensor data can be analyzed by the perception system 203, the prediction system 204, and the motion planning system 205 to determine the motion plan.

The motion planning system 205 can provide control commands to the one or more vehicle controls 207. For example, the one or more vehicle controls 207 can include throttle systems, brake systems, steering systems, and other control systems, each of which can include various vehicle controls (e.g., actuators or other devices that control gas flow, steering, and braking) to control the motion of the vehicle 200. The various vehicle controls 207 can include one or more controllers, control devices, motors, and/or processors. In some examples, the one or more vehicle controls 207 include one or more actuators for opening or closing a storage space (e.g., compartment, trunk, frunk, box), a window, a port (e.g., charging port), a sun roof, or other hardware components of the vehicle.

The vehicle controls 207 include a brake control module 220. The brake control module 220 is configured to receive a braking command and bring about a response by applying (or not applying) the vehicle brakes. In some examples, the brake control module 220 includes a primary system and a secondary system. The primary system receives braking commands and, in response, brakes the vehicle 200. The secondary system may be configured to determine a failure of the primary system to brake the vehicle 200 in response to receiving the braking command.

A steering control system 232 is configured to receive a steering command and bring about a response in the steering mechanism of the vehicle 200. The steering command is provided to a steering system to provide a steering input to steer the vehicle 200.

A lighting/auxiliary control module 236 receives a lighting or auxiliary command. In response, the lighting/auxiliary control module 236 controls a lighting and/or auxiliary system of the vehicle 200. Controlling a lighting system may include, for example, turning on, turning off, or otherwise modulating headlights, parking lights, running lights, etc.

Controlling an auxiliary system may include, for example, modulating windshield wipers, a defroster, etc.

A throttle control system 234 is configured to receive a throttle command and bring about a response in the engine speed or other throttle mechanism of the vehicle. For example, the throttle control system 234 can instruct an engine and/or engine controller, or other propulsion system component, to control the engine or other propulsion system of the vehicle 200 to accelerate, decelerate, or remain at its current speed.

Each of the perception system 203, the prediction system 204, the motion planning system 205, the commander system 211, the navigator system 213, and the localizer system 230 can be included in or otherwise be a part of the vehicle autonomy system 202 configured to control the vehicle 200 based at least in part on data obtained from the one or more sensors 201. For example, data obtained by the one or more sensors 201 can be analyzed by each of the perception system 203, the prediction system 204, and the motion planning system 205 in a consecutive fashion in order to control the vehicle 200. While FIG. 2 depicts elements suitable for use in a vehicle autonomy system according to example aspects of the present disclosure, one of ordinary skill in the art will recognize that other vehicle autonomy systems can be configured to control an autonomous vehicle based on sensor data.

The vehicle autonomy system 202 includes one or more computing devices, which may implement all or parts of the perception system 203, the prediction system 204, the motion planning system 205, and/or the localizer system 230. Descriptions of hardware and software configurations for computing devices to implement the vehicle autonomy system 202 and/or the service assignment system 102 of FIG. 1 are provided herein with reference to FIGS. 3 and 4.

Figure 3:
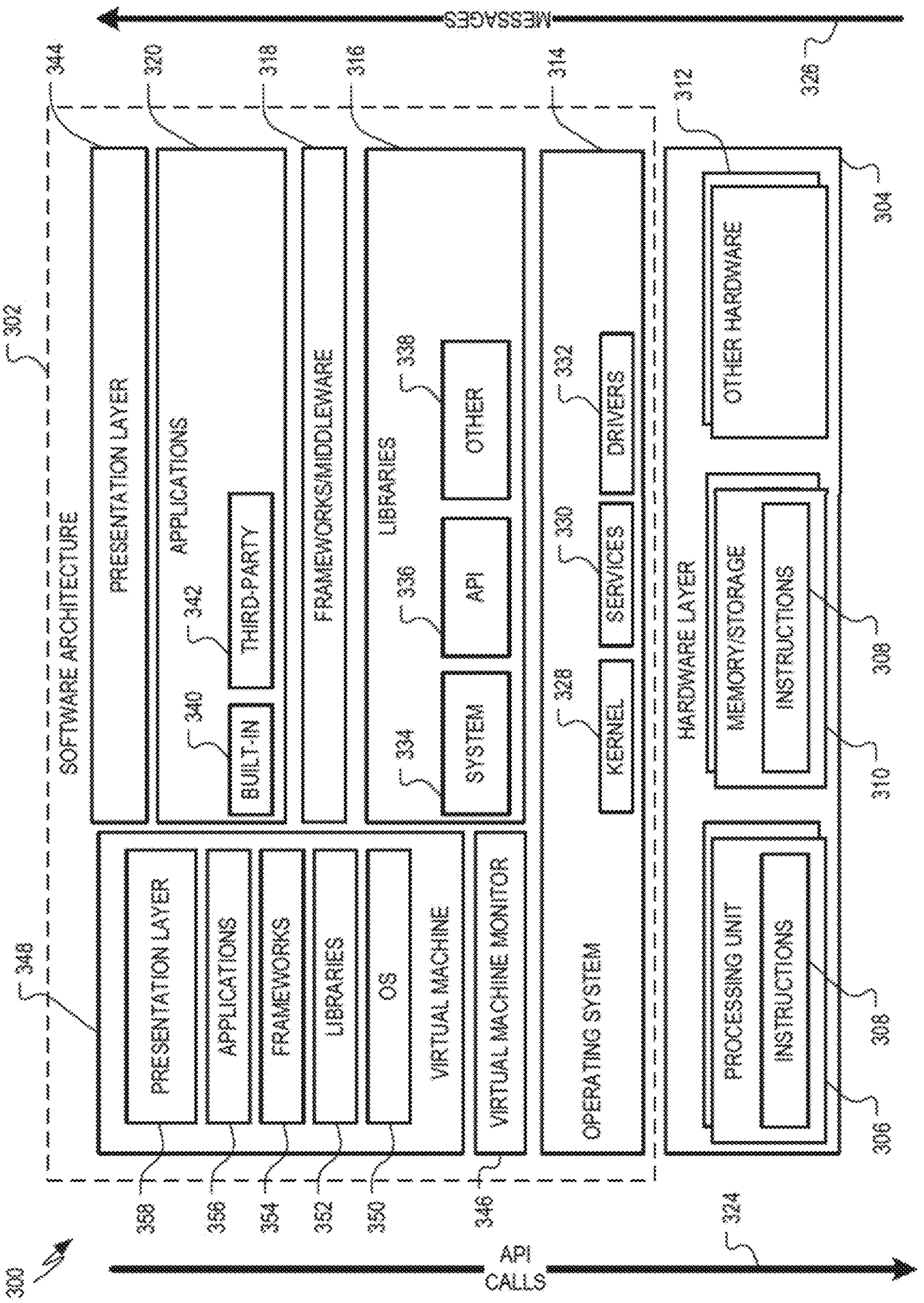
FIG. 3 is a block diagram showing one example of a software architecture for a computing device, according to some examples.

FIG. 3 is a block diagram showing one example of a software architecture 302 for a computing device, according to some examples. The software architecture 302 may be used in conjunction with various hardware architectures, for example, as described herein. FIG. 3 is merely a non-limiting example of a software architecture 302 that may be used to implement one or more of the computing systems described herein including, for example, the vehicle autonomy systems of the various AVs 110A, 110B, 110N, 114A, 114B, 114N. It will be appreciated that this, and/or many other suitable architectures may be implemented to facilitate the functionality described herein.

A representative hardware layer 304 is illustrated and can represent, for example, any of the above-referenced computing devices. In some examples, the hardware layer 304 may be implemented according to a hardware architecture, such as the hardware architecture 400 of FIG. 4 and/or the software architecture 302 of FIG. 3.

The representative hardware layer 304 comprises one or more processing units 306 having associated executable instructions 308. The executable instructions 308 represent the executable instructions of the software architecture 302, including implementation of the methods, modules, components, and so forth of FIGS. 1-7. The hardware layer 304 also includes memory and/or storage modules 310, which also have the executable instructions 308. The hardware layer 304 may also comprise other hardware 312, which represents any other hardware of the hardware layer 304, such as the other hardware illustrated as part of the hardware architecture 400.

In the example architecture of FIG. 3, the software architecture 302 may be conceptualized as a stack of layers where each layer provides particular functionality. For example, the software architecture 302 may include layers such as an operating system 314, libraries 316, middleware layer 318, applications 320, and a presentation layer 344. Operationally, the applications 320 and/or other components within the layers may invoke application programming interface (API) calls 324 through the software stack and receive a response, returned values, and so forth illustrated as messages 326 in response to the API calls 324. The layers illustrated are representative in nature, and not all software architectures have all layers. For example, some mobile or special-purpose operating systems may not provide a middleware layer 318, while others may provide such a layer. Other software architectures may include additional or different layers.

The operating system 314 may manage hardware resources and provide common services. The operating system 314 may include, for example, a kernel 328, services 330, and drivers 332. The kernel 328 may act as an abstraction layer between the hardware and the other software layers. For example, the kernel 328 may be responsible for memory management, processor management (e.g., scheduling), component management, networking, security settings, and so on. The services 330 may provide other common services for the other software layers. In some examples, the services 330 include an interrupt service. The interrupt service may detect the receipt of a hardware or software interrupt and, in response, cause the software architecture 302 to pause its current processing and execute an interrupt service routine (ISR) when an interrupt is received. The ISR may generate an alert.

The drivers 332 may be responsible for controlling or interfacing with the underlying hardware. For instance, the drivers 332 may include display drivers, camera drivers, Bluetooth® drivers, flash memory drivers, serial communication drivers (e.g., Universal Serial Bus (USB) drivers), Wi-Fi® drivers, near-field communication (NFC) drivers, audio drivers, power management drivers, and so forth depending on the hardware configuration.

The libraries 316 may provide a common infrastructure that may be used by the applications 320 and/or other components and/or layers. The libraries 316 typically provide functionality that allows other software modules to perform tasks in an easier fashion than by interfacing directly with the underlying operating system 314 functionality (e.g., kernel 328, services 330, and/or drivers 332). The libraries 316 may include system libraries 334 (e.g., C standard library) that may provide functions such as memory allocation functions, string manipulation functions, mathematic functions, and the like. In addition, the libraries 316 may include API libraries 336 such as media libraries (e.g., libraries to support presentation and manipulation of various media formats such as MPEG4, H.264, MP3, AAC, AMR, JPG, and PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 316 may also include a wide variety of other libraries 338 to provide many other APIs to the applications 320 and other software components/modules.

The middleware layer 318 (also sometimes referred to as frameworks) may provide a higher-level common infrastructure that may be used by the applications 320 and/or other software components/modules. For example, the middleware layer 318 may provide various graphical user interface (GUI) functions, high-level resource management, high-level location services, and so forth. The middleware layer 318 may provide a broad spectrum of other APIs that may be used by the applications 320 and/or other software components/modules, some of which may be specific to a particular operating system or platform.

The applications 320 include built-in applications 340 and/or third-party applications 342. Examples of representative built-in applications 340 may include, but are not limited to, a contacts application, a browser application, a book reader application, a location application, a media application, a messaging application, and/or a game application. The third-party applications 342 may include any of the built-in applications 340 as well as a broad assortment of other applications. In a specific example, the third-party application 342 (e.g., an application developed using the Android™ or iOS™ software development kit (SDK) by an entity other than the vendor of the particular platform) may be mobile software running on a mobile operating system such as iOS™, Android™, Windows® Phone, or other computing device operating systems. In this example, the third-party application 342 may invoke the API calls 324 provided by the mobile operating system such as the operating system 314 to facilitate functionality described herein.

The applications 320 may use built-in operating system functions (e.g., kernel 328, services 330, and/or drivers 332), libraries (e.g., system libraries 334, API libraries 336, and other libraries 338), or middleware layer 318 to create user interfaces to interact with users of the system. Alternatively, or additionally, in some systems, interactions with a user may occur through a presentation layer, such as the presentation layer 344. In these systems, the application/module "logic" can be separated from the aspects of the application/module that interact with a user.

Some software architectures use virtual machines. For example, systems described herein may be executed using one or more virtual machines executed at one or more server computing machines. In the example of FIG. 3, this is illustrated by a virtual machine 348. A virtual machine creates a software environment where applications/modules can execute as if they were executing on a hardware computing device. The virtual machine 348 is hosted by a host operating system (e.g., the operating system 314) and typically, although not always, has a virtual machine monitor 346, which manages the operation of the virtual machine 348 as well as the interface with the host operating system (e.g., the operating system 314). A software architecture executes within the virtual machine 348, such as an operating system 350, libraries 352, frameworks/middleware 354, applications 356, and/or a presentation layer 358. These layers of software architecture executing within the virtual machine 348 can be the same as corresponding layers previously described or may be different.

Figure 4:
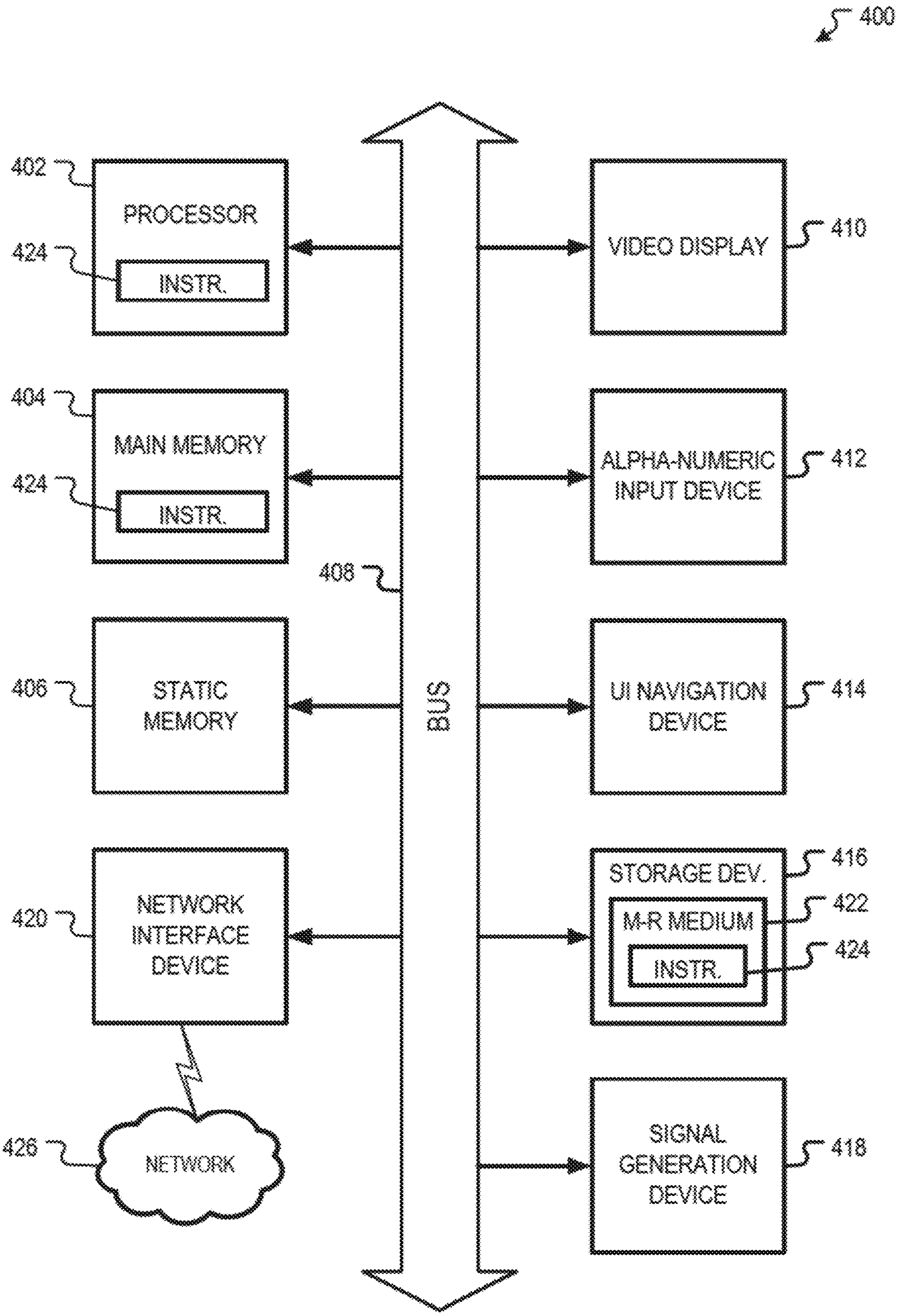
FIG. 4 is a block diagram illustrating a hardware architecture of an example computing device, within which a set or sequence of instructions can be executed to cause a machine to perform examples of any one of the methodologies discussed herein.

FIG. 4 is a block diagram illustrating a hardware architecture 400 of an example computing device, within which a set or sequence of instructions can be executed to cause a machine to perform examples of any one of the methodologies discussed herein. The hardware architecture 400 describes a computing device for executing the vehicle autonomy system, described herein.

The hardware architecture 400 may operate as a standalone device or may be connected (e.g., networked) to other machines. In a networked deployment, the hardware architecture 400 may operate in the capacity of either a server or a client machine in server-client network environments, or it may act as a peer machine in peer-to-peer (or distributed) network environments. The hardware architecture 400 can be implemented in a personal computer (PC), a tablet PC, a hybrid tablet, a set-top box (STB), a personal digital assistant (PDA), a mobile telephone, a web appliance, a network router, a network switch, a network bridge, or any machine capable of executing instructions (sequential or otherwise) that specify operations to be taken by that machine.

The example hardware architecture 400 includes a processor unit 402 comprising at least one processor (e.g., a central processing unit (CPU), a graphics processing unit (GPU), or both, processor cores, compute nodes). The hardware architecture 400 may further comprise a main memory 404 and a static memory 406, which communicate with each other via a link 408 (e.g., a bus). The hardware architecture 400 can further include a video display unit 410, an input device 412 (e.g., a keyboard), and a UI navigation device 414 (e.g., a mouse). In some examples, the video display unit 410, input device 412, and UI navigation device 414 are incorporated into a touchscreen display. The hardware architecture 400 may additionally include a storage device 416 (e.g., a drive unit), a signal generation device 418 (e.g., a speaker), a network interface device 420, and one or more sensors (not shown), such as a Global Positioning System (GPS) sensor, compass, accelerometer, or other sensor.

In some examples, the processor unit 402 or another suitable hardware component may support a hardware interrupt. In response to a hardware interrupt, the processor unit 402 may pause its processing and execute an ISR, for example, as described herein.

The storage device 416 includes a machine-readable medium 422 on which is stored one or more sets of data structures and instructions 424 (e.g., software) embodying or used by any one or more of the methodologies or functions described herein. The instructions 424 can also reside, completely or at least partially, within the main memory 404, within the static memory 406, and/or within the processor unit 402 during execution thereof by the hardware architecture 400, with the main memory 404, the static memory 406, and the processor unit 402 also constituting machine-readable media.

Executable Instructions and Machine-Storage Medium

The various memories (i.e., main memory 404, static memory 406, and/or memory of the processor unit(s) 402) and/or the storage device 416 may store one or more sets of instructions and data structures (e.g., the instructions 424) embodying or used by any one or more of the methodologies or functions described herein. These instructions, when executed by the processor unit(s) 402, cause various operations to implement the disclosed examples.

As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed database, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices;

magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Signal Medium

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium" and "device-readable medium" mean the same thing and may be used interchangeably in this disclosure. The terms are defined to include both non-transitory machine-storage media and signal media. Thus, the terms include both storage devices/media and carrier waves/modulated data signals.

The instructions 424 can further be transmitted or received over a communications network 426 using a transmission medium via the network interface device 420 using any one of a number of well-known transfer protocols (e.g., Hypertext Transfer Protocol (HTTP)). Examples of communication networks include a local area network (LAN), a wide area network (WAN), the Internet, mobile telephone networks, plain old telephone service (POTS) networks, and wireless data networks (e.g., Wi-Fi, 3G, 4G Long-Term Evolution (LTE)/LTE-A, 5G, or WiMAX networks).

Figure 5:
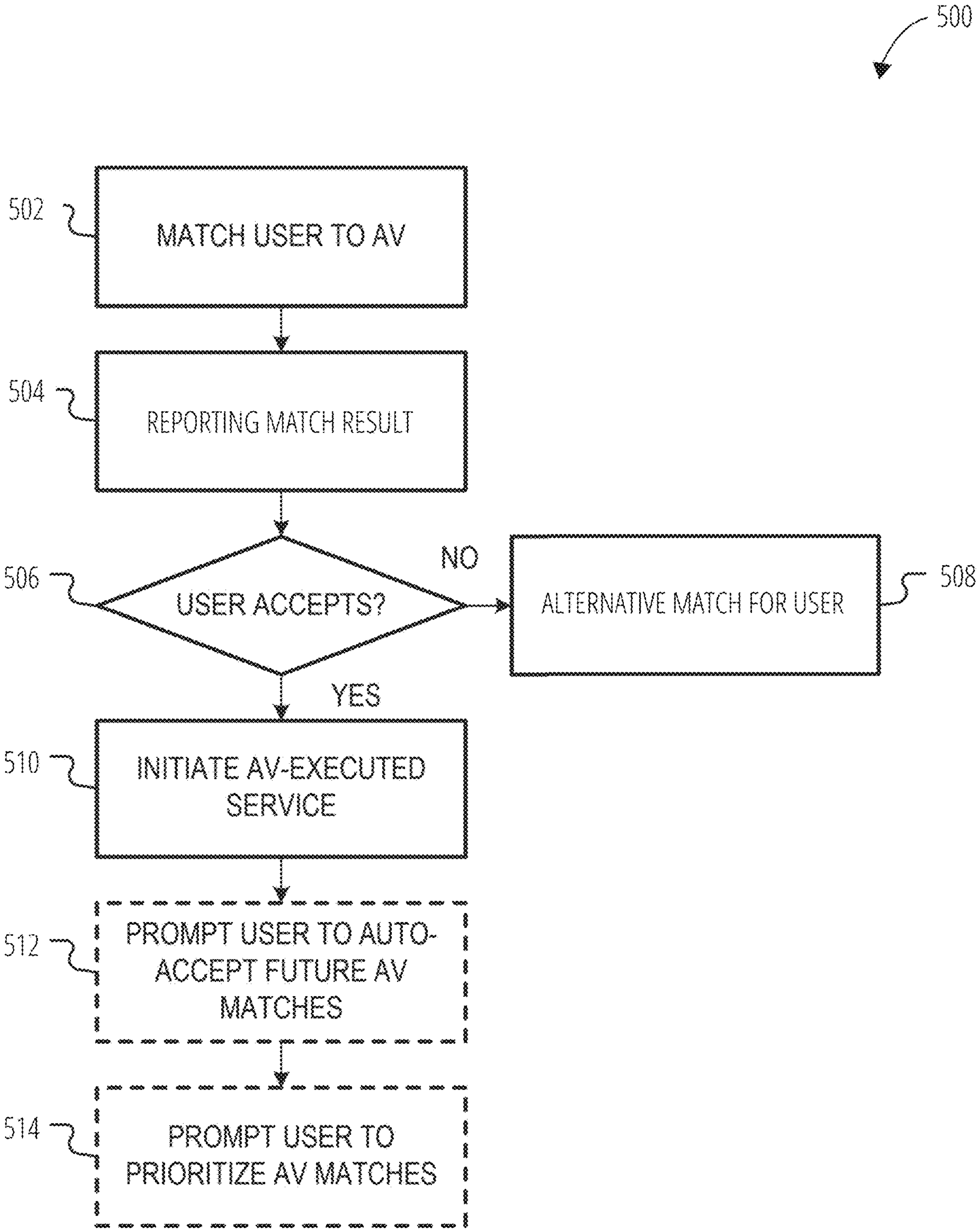
FIG. 5 is a flowchart showing a method that may be executed by the service assignment system to set an AV auto-accept and/or AV prioritization preference for a user, according to some examples.

FIG. 5 is a flowchart showing a method 500 that may be executed by the service assignment system 102 to set an AV auto-accept and/or AV prioritization preference for a user, according to some examples. In this example, the service assignment system 102 matches the user to an AV and displays an offer card that may include a match result indicating that the transportation service would be executed by the AV. If the user accepts the transportation service, then the service assignment system initiates AV execution of the transportation service and prompts the user to set an AV auto-accept preference and/or an AV prioritization preference.

In block 502, the service assignment system 102 may match an AV with the user in response to receiving a request for transportation service from the user 104.

In block 504, after matching the AV with the user 104, the service assignment system 102 may report a match result to the user computing device 106 and/or the AV provider system 108. In some examples, the service assignment system 102 causes the user computing device 106 to display an offer card that includes the match result indicating that the transportation service would be executed by the AV. In some examples, the offer card is displayed along with a request for permission to provide autonomous transportation services. In some examples, the offer card acts as a request for permission to provide autonomous transportation services. The user 104 may grant permission, indicating a receptiveness for autonomous transportation services. Alternatively, the user 104 may refuse to grant permission to receive autonomous transportation services.

Additionally, the service assignment system 102 may report the request for transportation service that includes the match result to the AV provider system 108 or the AV. The AV provider system 108 or the AV may decline the request for transportation service due to various factors. In some examples, the AV provider system 108 or the AV declines the request for transportation service based on a vehicle status. For example, the vehicle status includes having a low battery level. On the other hand, the AV provider system 108 or the AV may accept the request for transportation service by sending the service assignment system 102 a vehicle acceptance message indicating that the AV is ready to execute the transportation service.

In decision block 506, the service assignment system 102 may determine whether the user 104 accepts or rejects the transportation service. In these examples, the user 104 may accept or reject (e.g., decline) the transportation service to be executed by the AV. If the user 104 declines the transportation service, the service assignment system 102 may proceed to block 508. If the user 104 accepts the transportation service, the service assignment system 102 may proceed to block 510. In some examples, the offer card acts as a request for permission to provide autonomous transportation services, and based on the user accepting the autonomous transportation service shown in the offer card, the service assignment system 102 may determine that the permission to provide autonomous transportation services is obtained from the user 104.

In block 508, the user 104 may decline the transportation service. For example, the user computing device 106 receives a user decision indicating that the user declines the autonomous transportation services to be executed by the AV, and the user computing device 106 may report the user decision to the service assignment system 102. In some examples, the service assignment system 102 may perform an alternative match for the user in response to receiving the user decision. In some examples, the service assignment system 102 may match the user with a human-driven vehicle.

In block 510, the user 104 accepts the transportation service to be executed by the AV. For example, the user computing device 106 receives a user decision indicating that the user accepts the autonomous transportation service to be executed by the AV. The user computing device 106 may report the user decision to the service assignment system 102. In some examples, the service assignment system 102 may cause the user computing device 106 to initiate AV-executed service (e.g., autonomous transportation service). For example, in response to receiving the user decision to accept the autonomous transportation service, the service assignment system 102 sends a signal to the AV provider system 108, which instructs the AV to start providing autonomous transportation service to the user, such as navigating to a pickup location.

In block 512, the service assignment system 102 may cause the user computing device 106 to prompt the user to auto-accept future autonomous transportation services. To auto-accept future autonomous transportation services, the service assignment system 102 may skip the decision block 506 that determines if the user accepts the autonomous transportation service. In some examples, in response to matching the user with the AV, the service assignment system 102 may report the match result to the user and instruct the AV to start providing the autonomous transportation service without waiting for the user's acceptance to the transportation service. To prompt the user to auto-accept future autonomous transportation services, the service assignment system 102 may cause the user computing device 106 to display a user interface (e.g., UI user interface 900*b*) that comprises a UI element configured to receive a preference setting. In some examples, the block 512 is optional.

In block 514, the service assignment system 102 may cause the user computing device 106 to prompt the user to prioritize AV matches, that is, to prioritize autonomous transportation services. In other words, when the service assignment system 102 receives a request for transportation service from the user, and the service assignment system 102 determines that both AVs and vehicles with human drivers are available to provide the requested transportation service, the service assignment system 102 may prioritize matching the user with an AV over a human-driven vehicle. In some examples, the service assignment system 102 may cause the user computing device 106 to display the user interface (similar to the user interface mentioned in block 512) that comprises another UI element configured to receive another preference setting on whether to prioritize AV matches. In some examples, the block 514 is optional.

Figure 6:
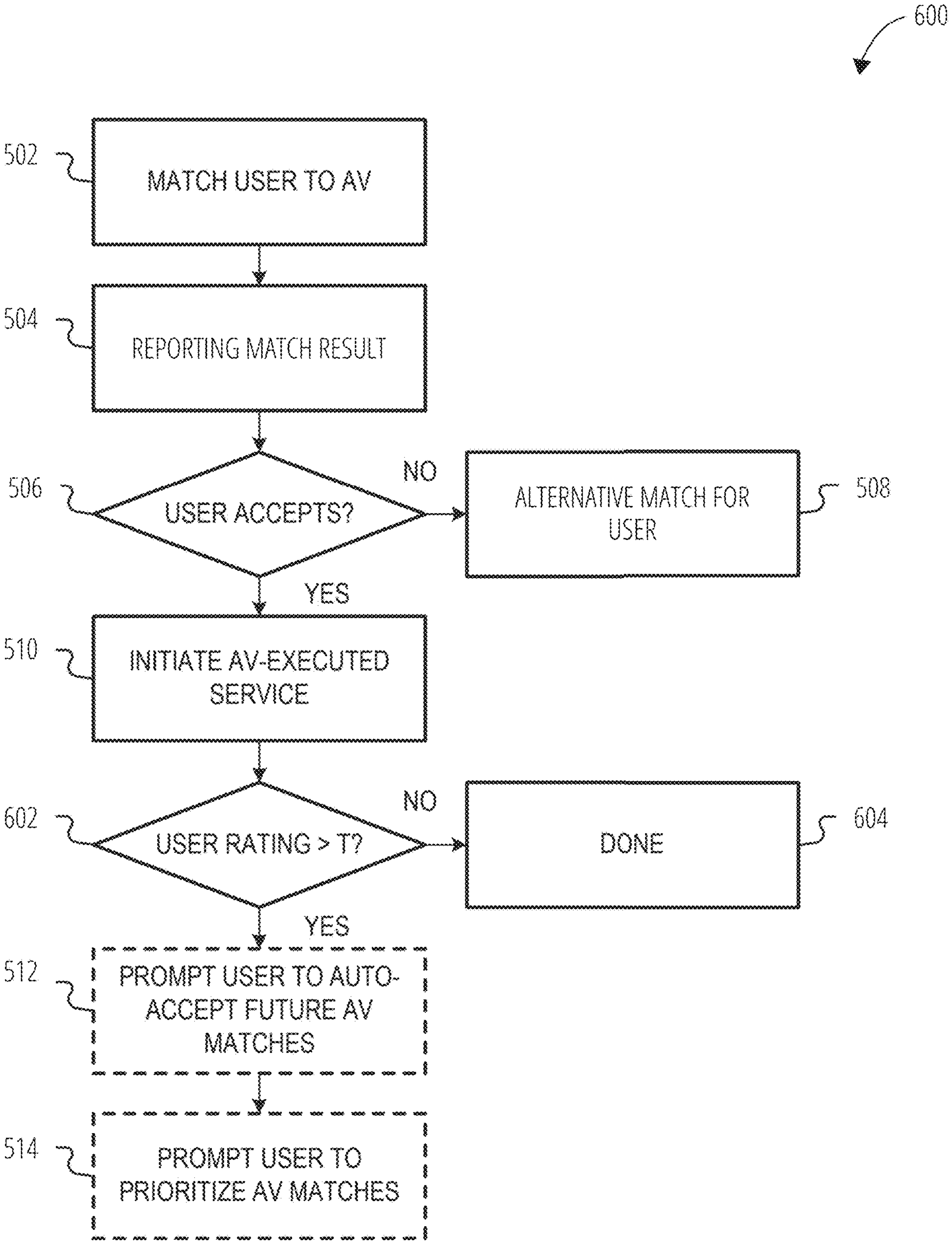
FIG. 6 is a flowchart showing a method that may be executed by the service assignment system to set an AV auto-accept and/or AV prioritization preference for a user, according to some examples.

FIG. 6 is a flowchart showing a method 600 that may be executed by the service assignment system 102 to set an AV auto-accept and/or AV prioritization preference for a user, according to some examples. In this example, the service assignment system matches the user to an AV and causes a display of an offer card that may include a match result indicating that the transportation service would be executed by the AV. If the user accepts the transportation service, the service assignment system 102 initiates AV execution of the requested transportation service. If the user provides a rating of an autonomous transportation service meeting a threshold, then the service assignment system 102 prompts the user to set an AV auto-accept preference and or AV prioritization preference.

In decision block 602, the service assignment system 102 receives a rating of the transportation service executed by the AV. The rating may be represented by a number of stars (e.g., points, a numeric number). The rating may be correlated with the receptiveness of the user toward autonomous transportation services. The service assignment system 102 may determine whether the rating of a particular transportation service transgresses the threshold. In some examples, the rating is given based on a range from one star to five stars, and the threshold is four stars. In some other examples, the rating is a numeric value ranging from 0 to 5, and the threshold is 4. Put another way, based on the rating is above 4 or 4 stars, the service assignment system 102 may proceed to block 512 and/or block 514; otherwise, based on the rating being lower than the threshold, the service assignment system 102 proceed to block 604.

In block 604, the service assignment system 102 determines the outcome of the decision block 602 is no, indicating that the rating to the transportation service is below the threshold. The service assignment system 102 may end the method 600.

Figure 7:
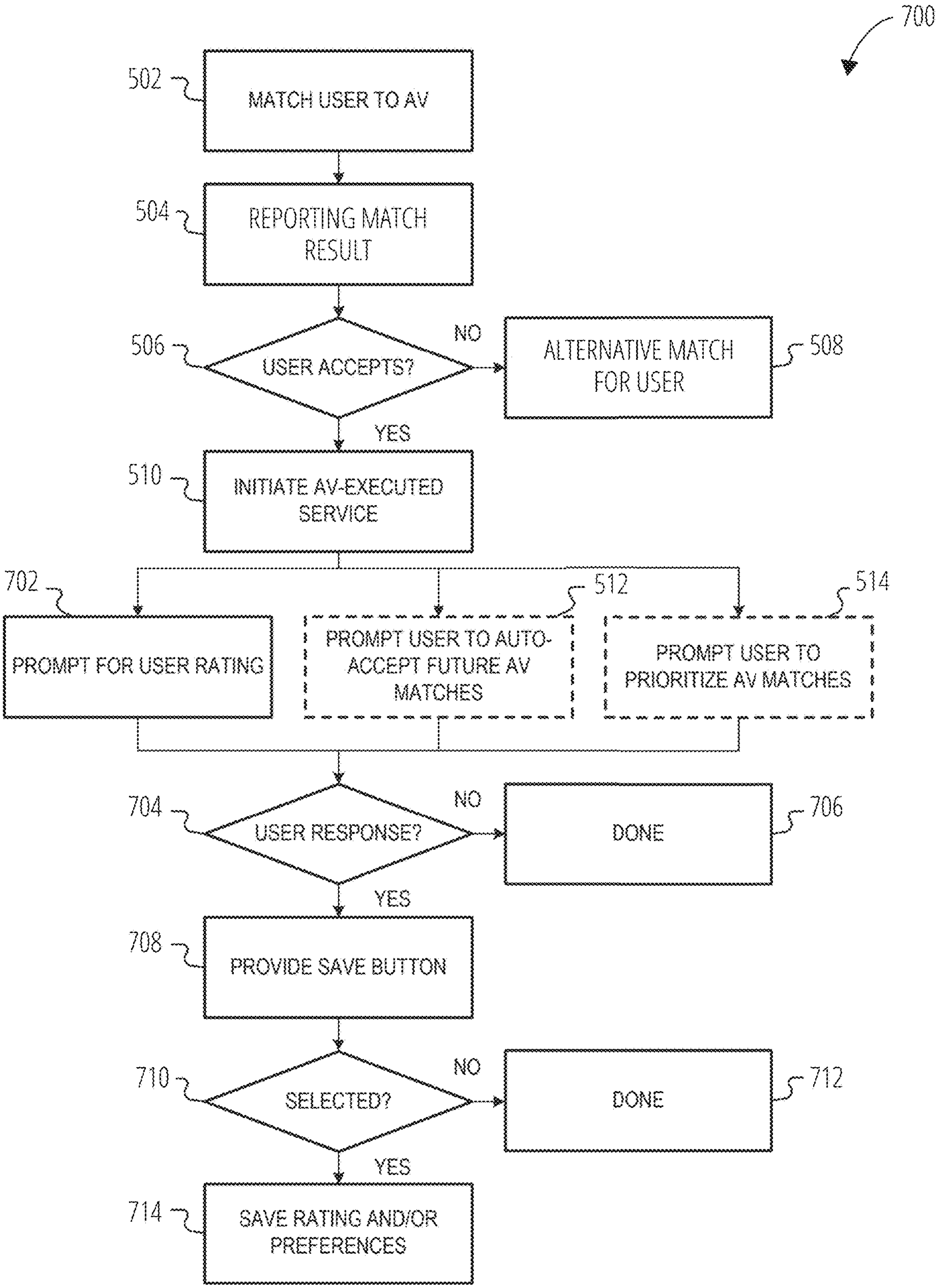
FIG. 7 is a flowchart showing a method that may be executed by the service assignment system to set an AV auto-accept and/or AV prioritization preference for a user, according to some examples.

FIG. 7 is a flowchart showing a method 700 that may be executed by the service assignment system 102 to set an AV auto-accept and/or AV prioritization preference for a user, according to some examples. In this example, after initiation of an autonomous transportation service for a user, the user is provided with a prompt to provide a user rating for a transportation service and also provided with a prompt to set an AV auto-accept preference and/or an AV prioritization preference. The prompts may be provided via the UI 122. If the user selects one of the prompts, then a save button or other UI element may be provided. When the user selects the save button or other UI element, the service assignment system 102 may save the rating provided by the user (if any) and/or a preference change or changes provided by the user (if any).

After performing the block 510, the service assignment system 102 may perform block 702, and optionally, block 512 or block 514.

In block 702, the service assignment system 102 may prompt for a user rating by the user who received the autonomous transportation service executed by the AV. In some examples, the service assignment system 102 may cause the user computing device 106 to display a prompt asking the user to provide a rating for the autonomous transportation service. The prompt is described in more detail with reference to FIG. 8. In some examples, the service assignment system 102 may perform block 512 or block 514 simultaneously with block 702.

In decision block 704, the service assignment system 102 determines whether the user has provided a response with respect to the prompts related to block 702, block 512, or block 514. If no, the service assignment system 102 may proceed to block 706. For example, if the user does not provide any response with respect to any of the prompts, the service assignment system 102 may stop displaying the prompts after a timeout. If yes, the service assignment system 102 may proceed to block 708.

In block 708, the service assignment system 102 may provide a save button for the user to save the responses to one or more of the prompts related to block 702, block 512, or block 514. For example, the user may give a rating for the autonomous transportation service, select auto-accept future autonomous transportation services, and select to prioritize autonomous transportation services over transportation services provided by human-driven vehicles. In response to selecting the save button, the service assignment system 102 may store these preferences selected by the user.

In decision block 710, the service assignment system 102 may determine whether the user has provided a response to any one of the prompts related to block 702, block 512, or block 514. If the user has provided a response to any one of the prompts, the service assignment system 102 may proceed to block 714, in which the service assignment system 102 may store the rating or the preferences indicated by the user. On the other hand, if the user fails to provide any responses, the service assignment system 102 may proceed to block 712, in which the service assignment system 102 does nothing.

Figure 8:
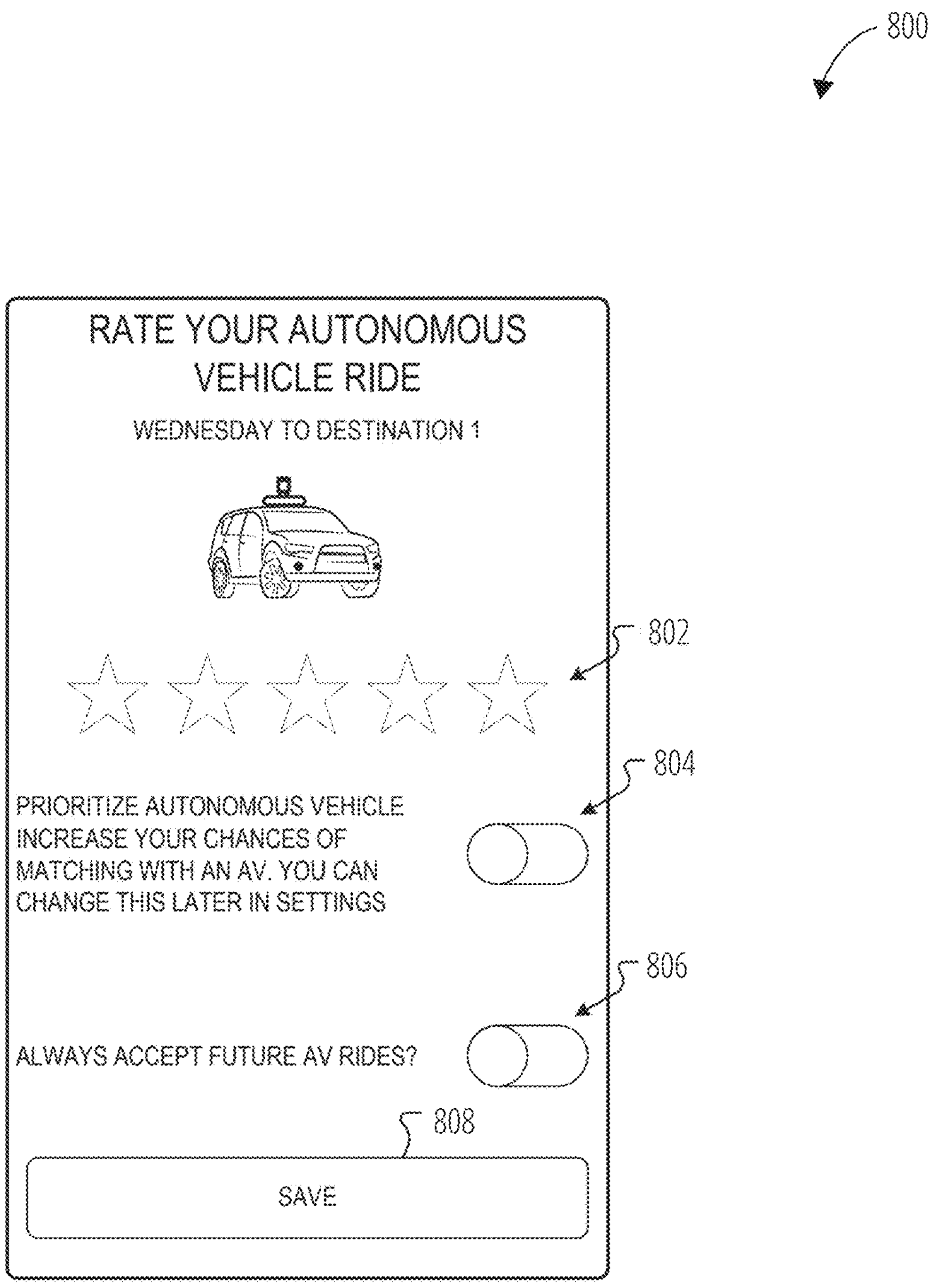
FIG. 8 is a screenshot showing a user interface including various user interface (UI) elements, according to some examples.

FIG. 8 is a screenshot showing a user interface 800 including various UI elements, according to some examples. The user interface 800 may be provided to a user to prompt the user to provide a rating of an AV-executed transportation service (e.g., an autonomous transportation service), an AV prioritization preference, and/or in AV auto-accept preference. A UI element 802 may receive the user's rating for an autonomous transportation service. In this example, the UI element 802 comprises star shapes. The user may select a number of the star shapes where a higher number of selected star shapes indicates a more positive rating. A UI element 804 includes a slider button that may be selected by the user to set an AV prioritization preference. A UI element 806 includes another slider button that may be selected by the user to set and AV auto-accept preference. A UI element 808 includes a button (e.g., a save button) that may be selected by the user to store the rating provided at UI element 802, the AV prioritization preference provided at UI element 804, and/or the AV auto-accept preference provided at UI element 806. In some examples, the UI element 808 may be omitted or un-selectable until the user has selected either a rating at UI element 802 or one (or more) of the preferences indicated by UI element 804, or UI element 806. In some examples, some of the UI elements 802, 804, 806 may be omitted. For example, the user interface 800 may comprise any combination or subset of the UI elements 802, 804, and 806.

Figure 9:
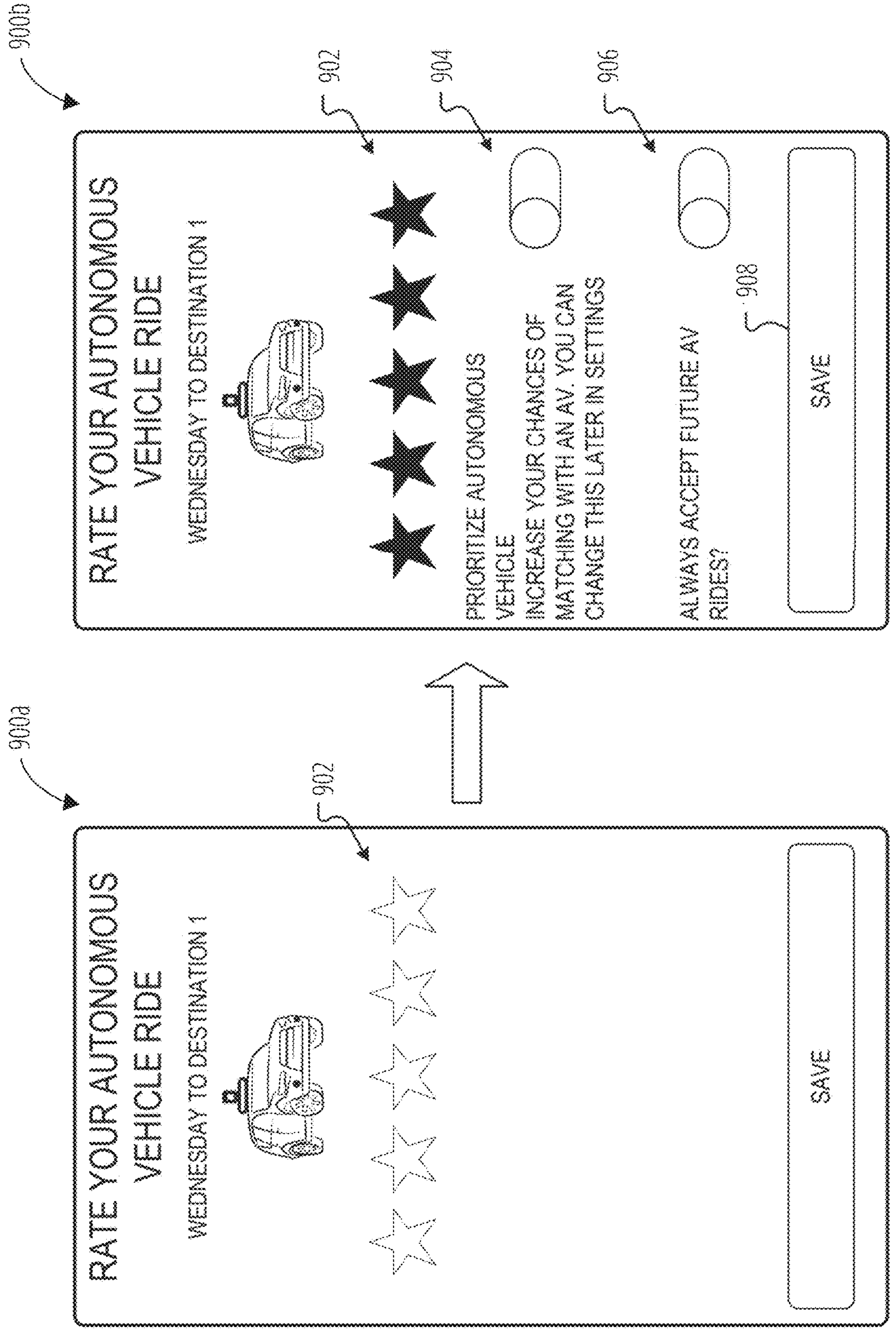
FIG. 9 shows two example user interfaces.

FIG. 9 shows two example user interfaces, user interface 900*a* and user interface 900*b*. The example user interface 900*a* includes a UI element 902 for receiving a user's rating of an autonomous transportation service. In some examples, if the user provides a rating meeting a threshold (e.g., a rating that is sufficiently positive), then the service assignment system 102 may display the user interface 900*b*. In the user interface 900*b*, the UI elements 902 has all of the star shapes shaded to indicate that the user has selected a "5-star" review. Also, in the user interface 900*b*, UI element 904 and UI element 906 are displayed. The UI element 904 includes a slider button that may be selected by the user to set an AV prioritization preference. The UI element 906 includes another slider button that may be selected by the user to set and AV auto-accept preference.

Figure 10:
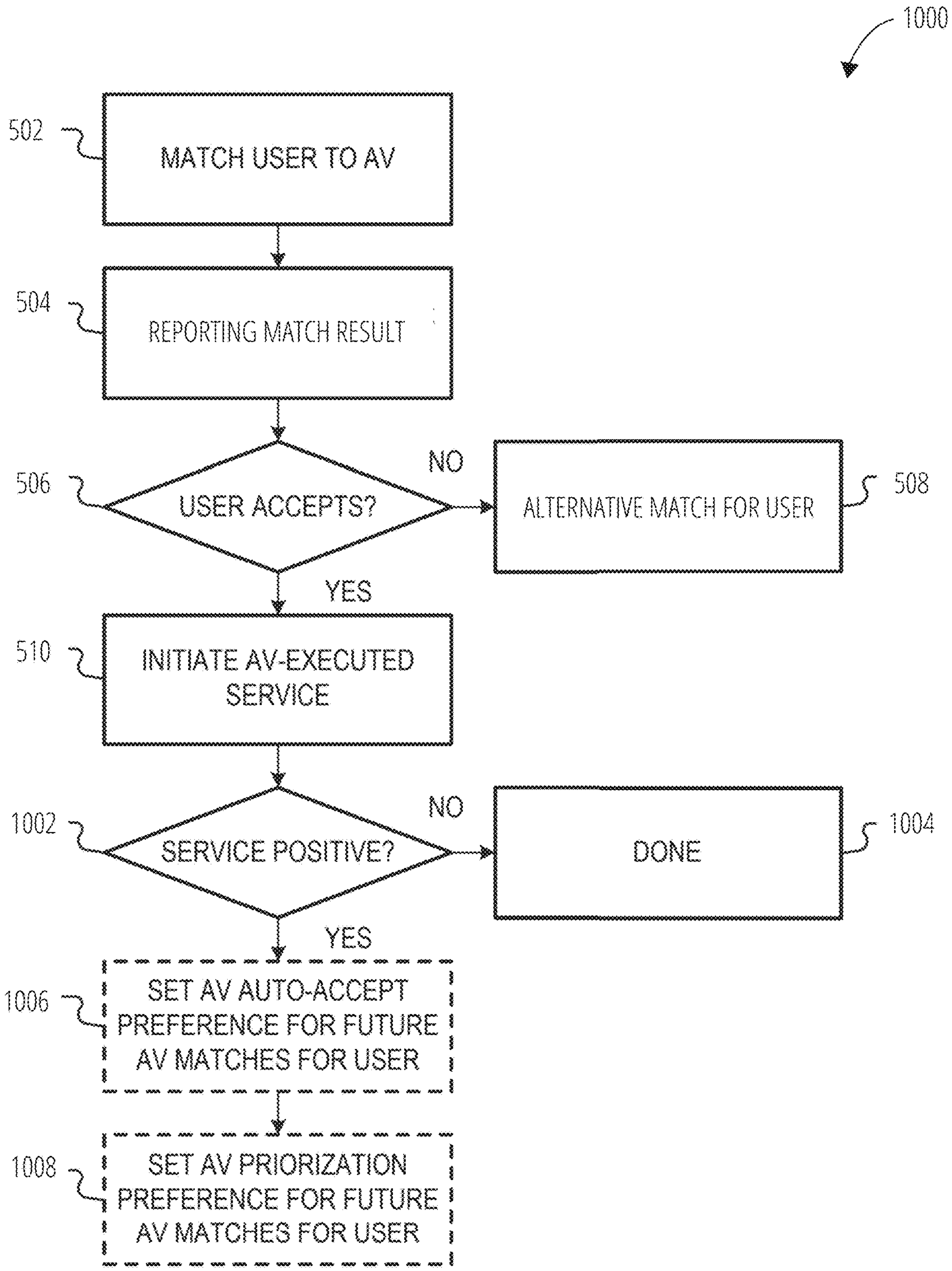
FIG. 10 is a flowchart showing a method that may be executed by the service assignment system to set an AV auto-accept and/or AV prioritization preference for a user, according to some examples

FIG. 10 is a flowchart showing a method 1000 that may be executed by the service assignment system 102 to set an AV auto-accept preference and/or AV prioritization preference for a user, according to some examples. In some examples, AV auto-accept preference and/or AV prioritization preference for a user can be set automatically when the user has received an autonomous transportation service that is positive. In some examples, a transportation service is positive if the user provides a user rating above a threshold and/or if the user has not filed a complaint about the service.

In decision block 1002, the service assignment system 102 may determine whether the autonomous transportation service received by the user is positive. In some examples, the service assignment system 102 receives a rating of the transportation service executed by the AV. The rating may be represented by a number of stars (e.g., points, a numeric number). The rating may be correlated with a receptiveness of the user toward autonomous transportation services. In some examples, the service assignment system 102 may determine whether the rating of a particular transportation service transgresses the threshold. In some examples, the rating is given based on a range from one star to five stars, and the threshold is four stars. Put another way, the service assignment system 102 may deem a transportation service as positive when the rating is above 4 or 4 stars. In some examples, the service assignment system 102 may deem a transportation service as positive based on a lack of a complaint associated with the autonomous transportation service. The service assignment system 102 may proceed to block 1006 and/or block 1008 based on the transportation service being deemed positive; otherwise, based on the rating being lower than the threshold or a complaint provided by the user, the service assignment system 102 may proceed to block 1004.

In block 1004, the service assignment system 102 may end the method 1000.

In block 1006, the service assignment system 102 may set an AV auto-accept preference for auto-accepting autonomous transportation services for future transportation services for the user; that is, in response to receiving a request for transportation service from the user, the service assignment system 102 may provide autonomous transportation services automatically (e.g., matching the user with an autonomous vehicle without causing a display of a request for permission to provide the autonomous transportation service). In a specific example, the service assignment system 102 has set the AV auto-accept preference for a user based on the user having a positive experience with an autonomous transportation service; in a subsequent transportation service, the service assignment system 102 receives a request for transportation service from the user, and the service assignment system 102 offers the request for transportation service to an AV. In response to the AV accepting the request, the service assignment system 102 determines to omit to cause the display, on the user computing device 106, of the request for permission to provide the user autonomous transportation services. In some examples, the service assignment system 102 performs the block 512 instead of the block 1006.

In block 1008, the service assignment system 102 may set an AV prioritization preference for future requests for transportation services. The AV prioritization preference may prioritize autonomous vehicles over a human-driven vehicle when matching the requests for transportation services. For example, in response to receiving a request for a transportation service from a user, the service assignment system 102 may identify a predetermined threshold of vehicles, including AVs and human-driven vehicles that are available to provide the transportation service to the user. The service assignment system 102 may first offer the request for transportation service to AVs prior to offering the same request to human-driven vehicles. When an AV is identified as a potential match for the transportation service, even if the AV is located further from the user than available human-driven vehicles, the service assignment system 102 may make a matching decision that prioritizes matching with the AV. In some examples, the service assignment system 102 makes the matching decision that prioritizes the AVs when the difference in estimated wait times between the more distant AV and the closer human-driven vehicle falls within an established threshold. In some other examples, the service assignment system 102 makes the matching decision by comparing the relative distances between the user and available vehicles. When considering an AV for a transportation request, the service assignment system 102 may match the user with the AV if the distance from the user does not exceed a predetermined distance threshold compared to the nearest available human-driven vehicle. In some examples, the service assignment system 102 performs the block 514 instead of the block 1008.

Figure 11:
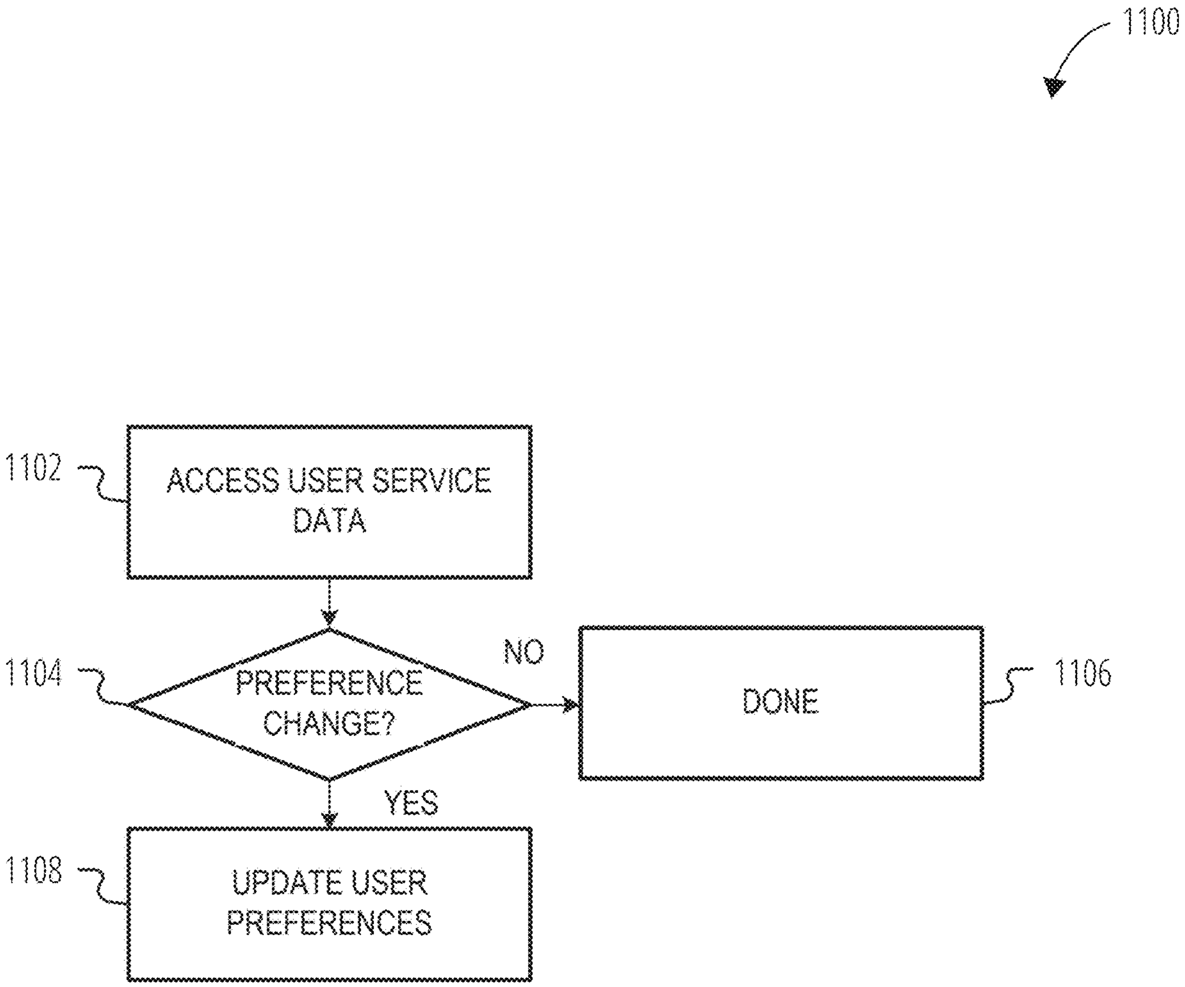
FIG. 11 is a flowchart showing a method that may be executed by the service assignment system to set an AV auto-accept and/or AV prioritization preference for a user, according to some examples.

FIG. 11 is a flowchart showing a method 1100 that may be executed by the service assignment system 102 to set an AV auto-accept preference and/or AV prioritization preference for a user, according to some examples. In some examples, the service assignment system 102 accesses user data (e.g., user service data) describing the user. The service assignment system 102 determines whether the user data indicates that there should be a preference change for the user. For example, the user data may indicate that the user should have an AV auto-accept preference and/or an AV prioritization preference set. If the user data indicates that there should be a preference change for the user, the service assignment system may implement a preference change.

In block 1102, the service assignment system 102 may access the user data. In some examples, the user data comprises rating history, transportation service history, or complaints.

In decision block 1104, the service assignment system 102 may determine whether the user data indicates a change to any preference settings, including the AV auto-accept preference and AV prioritization preference. In some examples, the rating history associated with autonomous transportation services includes more than three 1-star ratings, or there is a complaint associated with an autonomous transportation service, the service assignment system 102 may determine that there should be changes in both preference settings (e.g., AV auto-accept preference, AV prioritization preference).

If no, the service assignment system 102 may proceed to block 1106, which ends the method 1100. If yes, the service assignment system 102 may proceed to block 1108.

In block 1108, the service assignment system 102 may update the preference settings (e.g., AV auto-accept preference, AV prioritization preference) based on the user data. In some examples, a change to any of the preference settings may be toggling from one option to at least one other option. For example, a change in AV auto-accept preference is toggling from true to false.

Figure 12:
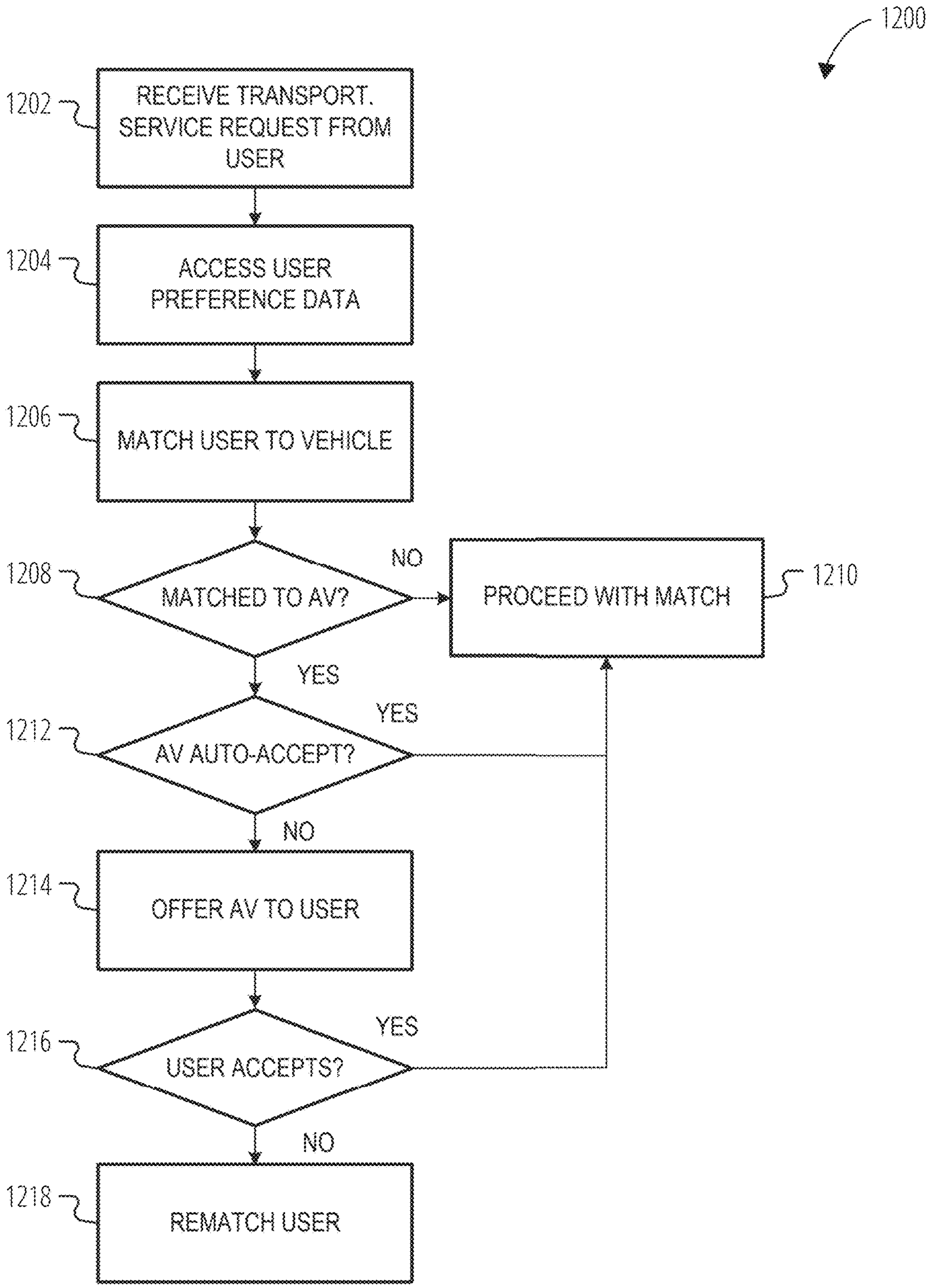
FIG. 12 is a flowchart showing a method for matching a user to a vehicle for the execution of a transportation service, according to some examples.

FIG. 12 is a flowchart showing a method 1200 for matching a user to a vehicle for the execution of a transportation service, according to some examples. In the example method 1200, the service assignment system 102 receives a request for transportation service from a user (block 1202). The service assignment system 102 accesses user data comprising preference settings for the user (block 1204). The user is matched to a vehicle (block 1206). For example, if the user has an AV prioritization preference set, the match may be modified to make it more likely that the user is matched to an AV. If the user is not matched to an AV (decision block 1208), then the match may proceed (operation block 1210). If the user is matched to an AV (i.e., YES to decision block 1208), then the user's AV auto-accept preference may be considered (decision block 1212). If the user has an AV auto-accept preference set, then the service assignment system may proceed with the match (block 1210). If the user does not have the AV auto-accept preference set, then the service assignment system may offer the AV trip to the user, inviting the user to accept (e.g., give permission to) autonomous transportation services (block 1214). If the user accepts (e.g., gives permission to) autonomous transportation services, then the match may proceed (block 1210). If the user actively rejects the autonomous transportation service, then the transportation assignment system may rematch the user with a human-driven vehicle (block 1218). In some examples, the service assignment system 102 may also indicate to the previously-matched AV that the user has rejected the match, thus freeing the previously-matched AV for a new match and, in some examples, allowing the previously-matched AV to cease moving toward a pickup location for the user. In some examples, in decision block 1216, the service assignment system 102 determines that the user has accepted the match based on an elapse of a predetermined length of time.

Figure 13:
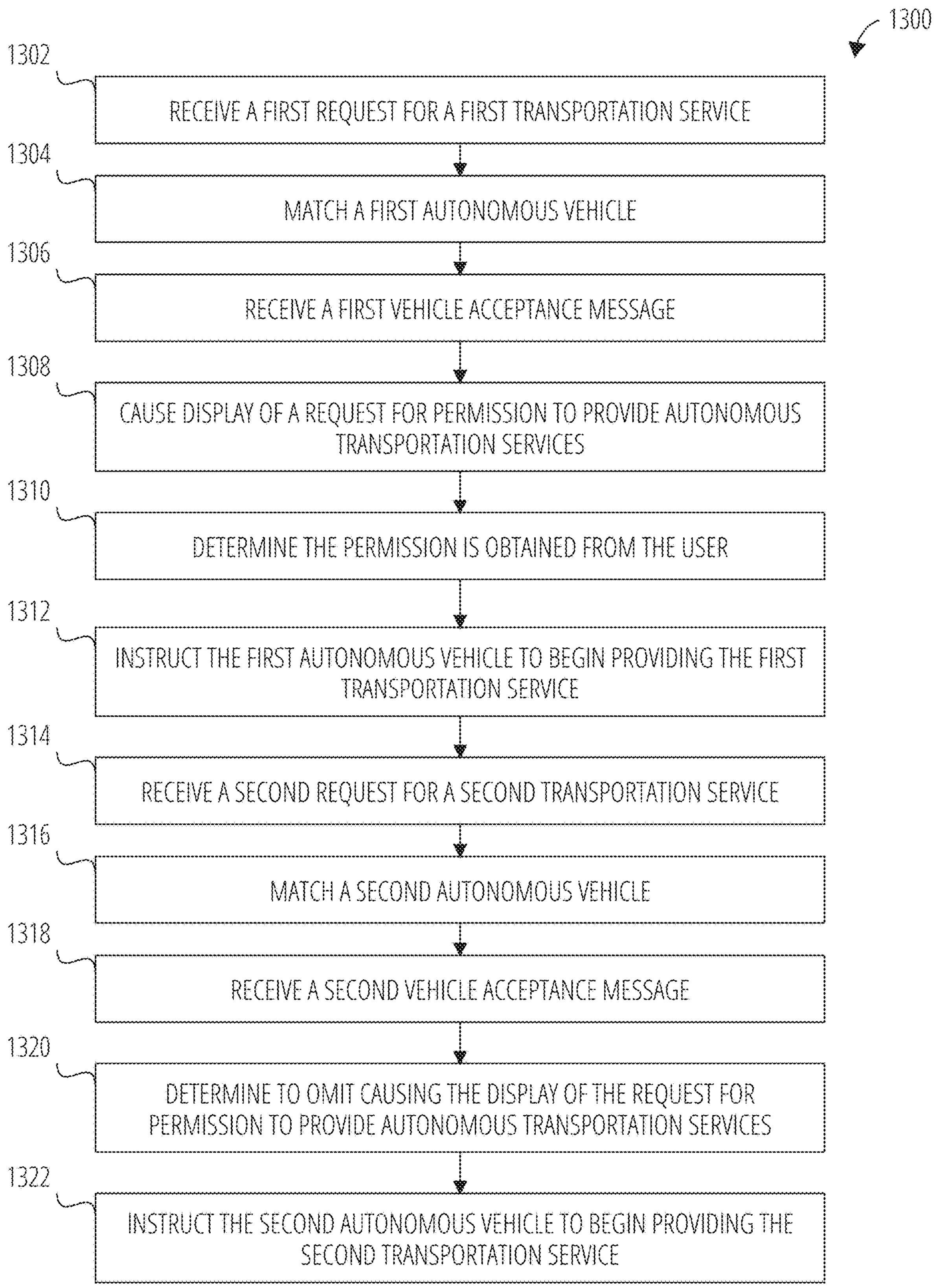
FIG. 13 is a flowchart illustrating a method for improving utilization of autonomous transportation services, according to some examples.

FIG. 13 is a flowchart illustrating a method 1300 for improving utilization of autonomous transportation services, according to some examples.

In block 1302, the service assignment system 102 receives a first request for first transportation service from a user computing device 106 associated with a user. In some examples, the users 104 executes an application associated with the service assignment system 102, where the user launches the application to make the first request for the first transportation service. The first transportation service may include properties such as a service start location (e.g., a pickup location), a service end location, and a description of the desired payload.

In block 1304, the service assignment system 102 matches a first autonomous vehicle to provide the first transportation service to the user. The service assignment system 102 may report a match result to the user computing device 106. There may be different ways to match the first autonomous vehicle with the user. The techniques and methods described herein do not impose any restrictions on how the first autonomous vehicle is matched with the first transportation service.

In some examples, the service assignment system 102 communicates the first request to the AV provider system 108, and the AV provider system 108 selects the first autonomous vehicle to execute the first transportation service. In some examples, the service assignment system 102 also sends a first vehicle acceptance message to the service assignment system 102.

In some examples, the service assignment system 102 identifies a list of candidate vehicles available for providing (e.g., executing) the first transportation service by filtering a mixed fleet of vehicles or a fleet of vehicles comprising autonomous vehicles based on various criteria including vehicle availability, vehicle locations, estimated time of arrival (e.g., to the pickup location), properties of the first request, a user's receptiveness to autonomous transportation service, and preference settings. After the list of candidate vehicles is identified, the service assignment system 102 may communicate the first request to the list of candidate vehicles, which may accept the first request. In some examples, a candidate vehicle may further evaluate readiness for providing the first transportation service based on a vehicle status (e.g., battery level) and may accept or decline the first request based on the readiness. The first autonomous vehicle may send a first vehicle acceptance message if it accepts the first request. The service assignment system 102 may match the first autonomous vehicle to execute the first transportation service if the first autonomous vehicle is the first to accept the first request among the list of candidate vehicles. In some examples, the AV provider system 108 may accept and/or decline the first request on behaves of the list of candidate vehicles by sending the first vehicle acceptance message to the service assignment system 102.

In block 1306, the service assignment system 102 receives a first vehicle acceptance message indicating that the first autonomous vehicle has accepted the first request. The AV provider system 108 or the first autonomous vehicle may send the first vehicle acceptance message to the service assignment system 102. In some examples, block 1306 is optional.

In block 1308, after receiving the first vehicle acceptance message, the service assignment system 102 causes display, on the user computing device 106, of a request for permission to provide autonomous transportation services. The request for permission may be referred to as an "offer card," which may be displayed on the user computing device 106. The offer card may include UI elements allowing the user to accept or decline the autonomous transportation service. In some examples, the offer card may be displayed for a predetermined length of time (e.g., 60 seconds).

In block 1310, the service assignment system 102 may determine the permission is obtained from the user. In some examples, upon accepting the autonomous transportation service, the user is deemed to have given permission to receive autonomous transportation services. In some examples, the service assignment system 102 may determine that the permission is obtained based on a user's interaction with the offer card. In some other examples, the service assignment system 102 determines that the permission is obtained after an elapse of the predetermined length of time.

In block 1312, after determining that permission is obtained from the user, the service assignment system 102 may instruct the first autonomous vehicle to begin providing the first transportation service. In some examples, the service assignment system 102 may report to the AV provider system 108 that permission is obtained from the user, and the AV provider system 108 instructs the first autonomous vehicle to execute the first transportation service. In some examples, the service assignment system 102 communicates with the AV provider system 108 through the API 117 to instruct the first autonomous vehicle to begin providing the first transportation service. For example, after the user explicitly gives permission by interacting with the offer card or gives permission implicitly due to offer card expiration, the service assignment system 102 sends instructions through the API 117 to the AV provider system 108, which then directs the first autonomous vehicle to proceed to the pickup location. For example, the causing the first autonomous vehicle to execute the first transportation service to the user includes causing the first autonomous vehicle to be en route to a pickup location associated with the user.

In block 1314, the service assignment system 102 receives a second request for a second transportation service from the user 104. Similar to receiving the first request for the first transportation service, the users 104 may execute the application associated with the service assignment system 102, where the user launches the application to make the second request for the second transportation service. The second transportation service may include properties such as another service start location (e.g., another pickup location), another service end location, and another description of the desired payload.

In block 1316, the service assignment system 102 matches a second autonomous vehicle to provide the second transportation service to the user. The service assignment system 102 may match a second autonomous vehicle to provide the second transportation service to the user in a similar manner as matching the first autonomous vehicle to provide the first transportation service described with reference to block 1304.

In block 1318, the service assignment system 102 receives a second vehicle acceptance message indicating that the second autonomous vehicle has accepted the second transportation service. The AV provider system 108 or the second autonomous vehicle may send the service assignment system 102 the second vehicle acceptance message after the user computing device 106 selects the second autonomous vehicle to execute the second transportation service, or after the second autonomous vehicle accepts the second request for the second transportation service.

In block 1320, the service assignment system 102 determines to omit to cause the display, on the user computing device 106, of the request for permission to provide autonomous transportation services. In some examples, the service assignment system 102 determines to omit the display the request for permission (offer card) on the user computing device 106 based on the user having previously completed an autonomous transportation service. In some other examples, the determining to omit the display of the request for permission is based on the transportation service history, rating history for previous autonomous transportation services, and whether the user has enabled AV auto-accept preferences. For example, the service assignment system 102 may automatically proceed to block 1322 without obtaining permission from repeat riders (i.e., users who have completed at least one autonomous transportation service), as the repeat riders have demonstrated familiarity and comfort with autonomous transportation services.

Omitting the request for permission provides technical solutions to optimize autonomous vehicle fleet utilization by reducing idle time for autonomous vehicles while waiting for an expiration of the offer card or the user's interaction with the offer card. For example, if it takes on average 13 seconds for a user to give explicit permission to the autonomous transportation service by interacting with the offer card, by omitting the request for permission, the service assignment system 102 eliminates the time an autonomous vehicle spends on idling and waiting for the permission. Instead, the matched vehicle may immediately provide the transportation service to the user. Other costs associated with network communication and processing overhead per trip are also reduced by omitting the request for permission.

In some examples, the service assignment system 102 employs a machine learning model trained to predict a receptiveness to autonomous transportation services. The receptiveness to autonomous transportation services may be associated with a likelihood of completing an autonomous transportation service without cancellation or complaint. In some examples, the receptiveness is determined based on whether the user is a repeat rider. In some examples, the receptiveness is determined based on user data such as rating history or past cancellations. The service assignment system 102 may determine whether to omit the request for permission based on the receptiveness predicted by the machine learning model. More details about the machine learning model are discussed with reference to FIG. 14. In sum, determining to omit the request for permission enables more efficient overall operations by optimizing both the computational resources spent on offer card interactions that may involve API calls and fleet operations.

In block 1322, the service assignment system 102 may directly or indirectly cause the second autonomous vehicle to begin executing the second transportation service (e.g., moving to a pickup location). In some examples, the service assignment system 102 may cause the second autonomous vehicle to execute the second transportation service via the user computing device 106. The service assignment system 102 may cause the second autonomous vehicle to begin executing the second transportation service in response to determining to omit displaying the request for permission (e.g., offer card) to the user. In some examples, the causing the second autonomous vehicle to provide the second transportation service includes causing the second autonomous vehicle to be en route to the pickup location indicated in the second request for the second transportation service.

In some examples, the service assignment system 102 may receive a cancellation of the second transportation service after instructing the second autonomous vehicle to begin providing the second transportation service. In response to the cancellation, the service assignment system 102 may match a human-driven vehicle to provide the second transportation service. The second autonomous vehicle may be referred to as a previously-matched AV and is free to accept other requests for transportation services after the cancellation.

After a completion of the second transportation service, the service assignment system 102 may receive a third request for a third transportation service from the user computing device 106 associated with the user. The service assignment system 102 may match a third autonomous vehicle to provide the third transportation service to the user. In some examples, the service assignment system 102 may receive a third vehicle acceptance message indicating that the third autonomous vehicle has accepted the third transportation service. In some examples, after matching the third autonomous vehicle to provide the third transportation service, the service assignment system 102 causes display, on the user computing device 106, of the request for permission to provide the autonomous transportation service. The service assignment system 102 causes the display of the request for permission at least in part based on the receiving the cancellation of the second transportation service. The service assignment system 102 may request for permission to provide autonomous transportation services from the user because the cancellation of the second transportation service involving the autonomous vehicle may indicate that the user's receptiveness to autonomous transportation services has changed, so a request for permission is preferred.

Figure 14:
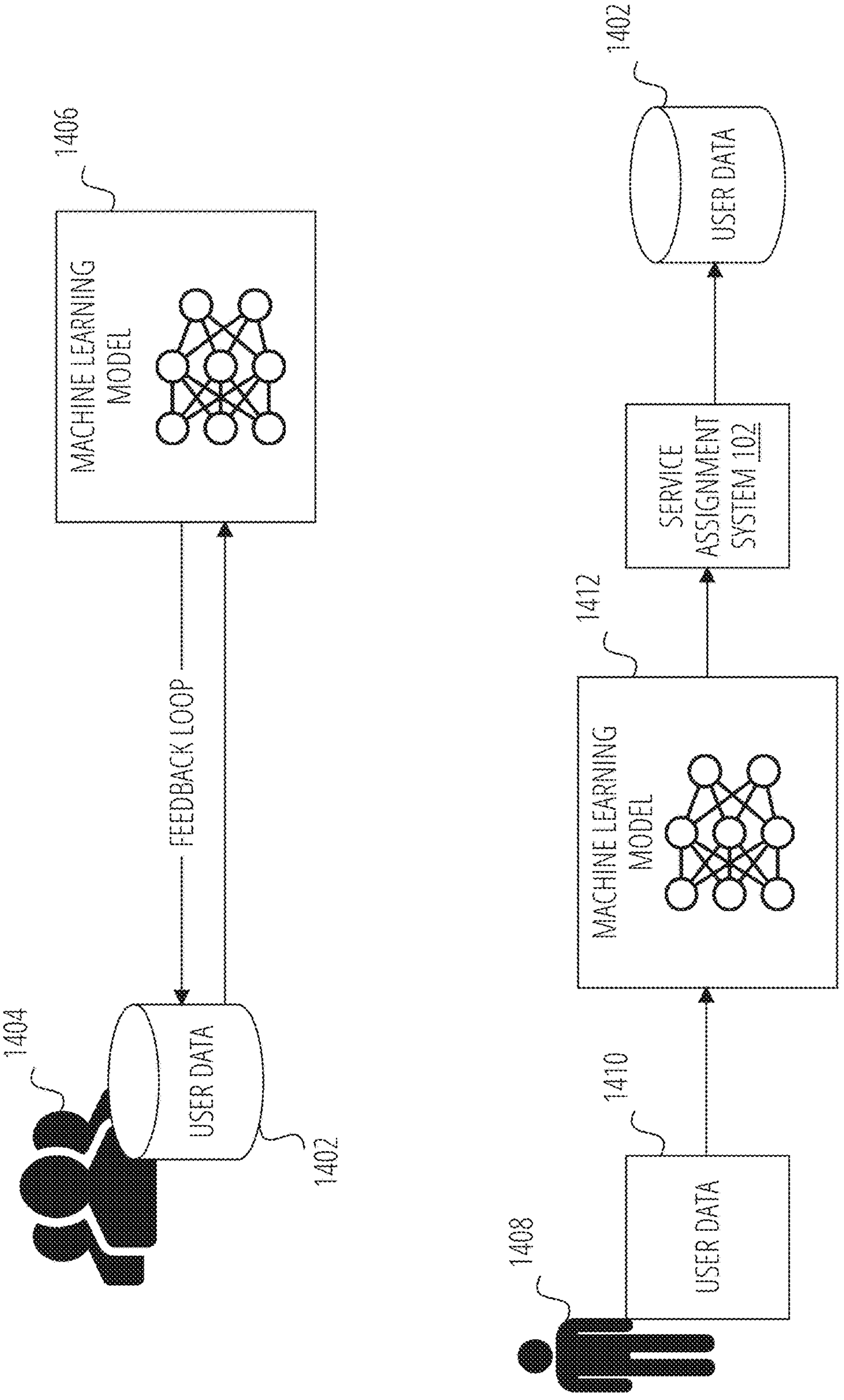
FIG. 14 is a conceptual diagram illustrating an example machine learning model that may be implemented by the service assignment system, according to some examples.

FIG. 14 is a conceptual diagram illustrating an example machine learning model that may be implemented by the service assignment system 102, according to some examples. The machine learning model 1406 may be trained to predict a receptiveness to autonomous transportation services. A training phase and a prediction phase are illustrated in FIG. 14. The training phase trains the machine learning model 1406 with user data 1402. After the machine learning model 1406 is trained, the machine learning model 1406 may be deployed as machine learning model 1412 in a prediction phase to make a prediction on the receptiveness to autonomous transportation services. The prediction causes the service assignment system 102 to match a user with an AV or a human-driven vehicle. The user's subsequent actions may be monitored or analyzed to continuously improve the predictions made by the machine learning model 1406 or machine learning model 1412.

The user data 1402 associated with a plurality of users 1404 may be collected as training data for the machine learning model 1406. The machine learning model 1406 may be trained to predict receptiveness to autonomous transportation services based on the user data 1402. In some examples, the user data 1402 includes transportation service history (e.g., completed, past cancellations), preference settings (e.g., AV auto-accept preference, AV prioritization preference), or feedback on previous transportation services (e.g., rating history, complaints). In some examples, the user data 1402 includes contextual data such as a location of the user, a pickup locations, time of day associated with requests for transportation services, and device types that may influence decision-making.

The training phase may include feeding the user data 1402 as input data to the machine learning model 1406. In some examples, the machine learning model 1406 may process the user data 1402 through supervised learning to predict a user's receptiveness to autonomous transportation services. During training, optimization techniques like gradient descent may be employed to minimize prediction errors and improve the model's accuracy.

The training phase may include a feedback loop, where actual user decisions regarding accepting or rejecting autonomous transportation services are incorporated back into the user data 1402 to retrain or refine the machine learning model 1406. In some examples, the actual user decisions may be indicated by the transportation service history included in the user data 1402. For example, if the machine learning model 1406 predicts a user would accept an autonomous vehicle but the user rejects the autonomous vehicle in favor of a human-driven vehicle, this preference is included in the user data 1402 to improve prediction accuracy.

The user data 1402 may get updated continuously as more user data is collected. The updated user data 1402 may be used in the feedback loop to continuously improve the machine learning model 1406 or machine learning model 1412. This ongoing training helps the model become increasingly accurate at predicting the receptiveness of a user and adapting to new behavior patterns over time.

The trained machine learning model may then be used by the service assignment system 102 to make intelligent matching decisions between users and autonomous vehicles based on the predicted receptiveness, helping to optimize fleet utilization and improve the user experience.

In the prediction phase, the machine learning model 1406 may be deployed as a machine learning model 1412. In some examples, the machine learning model 1412 is a version of the machine learning model 1406. The machine learning model 1412 may predict a user's receptiveness to autonomous transportation services in real-time and report the receptiveness to the service assignment system 102, which makes matching decisions based on the receptiveness. The machine learning model 1412 may predict the user's receptiveness based on the user data 1410 associated with the user 1408. The user data 1410 associated the user 1408 may include transportation service history (e.g., completed, past cancellations), preferences (e.g., AV auto-accept preference, AV prioritization preference), feedback on previous transportation services (e.g., rating history, complaints) associated with the user 1408. In some examples, the user data 1410 includes contextual data such as location of the user 1408, pickup locations, time of day associated with a request for transportation service, a device type, or a model of the user computing device.

In some examples, after receiving a request for transportation service from the user 1408, the user data 1410 associated with the user 1408 is fed into the machine learning model 1412. The machine learning model 1412 generates a prediction of the receptiveness of the user 1408 based on the machine learning model 1412. The prediction of the receptiveness is reported to the service assignment system 102, which proceeds to match the user 1408 with an AV or a human-driven vehicle based on the prediction of the receptiveness. For example, if the machine learning model 1412 predicts that the user 1408 is receptive to an autonomous transportation service, the service assignment system 102 matches the user 1408 with an AV after receiving a request for transportation service from the user 1408.

The user 1408 has the opportunity to reject the autonomous transportation service by canceling the transportation service after the service assignment system 102 matches the user 1408 with the AV. In some examples, the user 1408 may provide a reason for canceling the transportation service. For example, the user 1408 indicates that a human-driven vehicle is preferred over an AV in the reason for the cancellation. On the other hand, the user 1408 may accept the autonomous transportation service (e.g., complete the transportation service executed by the AV). Data associated with the user 1408 accepting or rejecting the autonomous transportation service may be stored in the user data 1402. In some examples, the data associated with the user 1408 accepting or rejecting the autonomous transportation service may be stored as the transportation service history in the user data 1402, thereby updating the user data 1402. The updated user data 1402 may be used in the feedback loop to continuously improve the machine learning model 1406 or machine learning model 1412.

The iterative process of improving the machine learning model 1406 or machine learning model 1412 allows the system to evolve dynamically. The more user data 1402 the service assignment system 102 receives by interacting with the users (e.g., the plurality of users 1404), the better the machine learning model 1406 or machine learning model 1412 becomes at making accurate predictions on a user's receptiveness.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Various components are described in the present disclosure as being configured in a particular way. A component may be configured in any suitable manner. For example, a component that is or that includes a computing device may be configured with suitable software instructions that program the computing device. A component may also be configured by virtue of its hardware arrangement or in any other suitable manner.

The above description is intended to be illustrative, and not restrictive. For example, the above-described examples (or one or more aspects thereof) can be used in combination with others. Other examples can be used, such as by one of ordinary skill in the art upon reviewing the above description. The Abstract is to allow the reader to quickly ascertain the nature of the technical disclosure, for example, to comply with 37 C.F.R. § 1.72 (b) in the United States of America. It is submitted with the understanding that it will not be used to interpret or limit the scope or meaning of the claims.

Also, in the above Detailed Description, various features can be grouped together to streamline the disclosure. However, the claims cannot set forth every feature disclosed herein, as examples can feature a subset of said features. Further, examples can include fewer features than those disclosed in a particular example. Thus, the following claims are hereby incorporated into the Detailed Description, with each claim standing on its own as a separate example. The scope of the examples disclosed herein is to be determined with reference to the appended claims, along with the full scope of equivalents to which such claims are entitled.

What is claimed is:

1. A method, comprising:

receiving, by a hardware processor, a first request for a first transportation service from a user device associated with a user;

matching, by the hardware processor, a first autonomous vehicle to provide the first transportation service to the user;

after the matching the first autonomous vehicle, causing display, by the hardware processor, on the user device, of a request for permission to provide autonomous transportation services;

determining, by the hardware processor, the permission is obtained from the user;

after determining that the permission is obtained from the user, instructing, by the hardware processor, a first vehicle autonomy system of the first autonomous vehicle to begin providing the first transportation service, wherein the vehicle autonomy system physically controls at least one of braking, steering or throttle of the first autonomous vehicle to autonomously navigate to a pickup location associated with the first transportation service;

receiving, by the hardware processor, a second request for a second transportation service from the user device;

matching, by the hardware processor, a second autonomous vehicle to provide the second transportation service to the user;

accessing, by the hardware processor, contextual user data from the user device associated with the user;

analyzing, by the hardware processor, the contextual user data from the user device using a trained machine learning model trained to generate a prediction of receptiveness of the user to autonomous services;

determining, by the hardware processor, to omit causing the display, on the user device, of the request for permission to provide the autonomous transportation services, the determination based on the prediction generated by the trained machine learning model; and in response to the determination to omit causing the display, instructing, by the hardware processor, a second vehicle autonomy system of the second autonomous vehicle to begin providing the second transportation service without waiting for user permission, wherein the second vehicle autonomy system physically controls at least one of braking, steering, or throttle of the second autonomous vehicle to autonomously navigate to a second pickup location associated with the second transportation service.

2. The method of claim 1, wherein the determining that the permission is obtained from the user is based on an elapse of a predetermined length of time after the causing the display of the request for permission.

3. The method of claim 1, further comprising:

accessing a transportation service history associated with the user, the transportation service history indicating the user has received transportation service executed by an autonomous vehicle; and wherein the determining to omit causing the display of the request for permission to provide the autonomous transportation services is based on the transportation service history.

4. The method of claim 3, wherein the transportation service history comprises past cancellations related to the autonomous transportation services.

5. The method of claim 1, wherein the user data comprises at least one of a current location of the user, a current time of day, and device characteristics of the user device.

6. The method of claim 5, wherein the user data comprises at least one of a transportation service history and a rating history.

7. The method of claim 1, wherein the determining to omit causing the display of the request for permission to provide the autonomous transportation services is based on a user location and a timing associated with the second transportation service.

8. The method of claim 1, further comprising:

inputting user data associated with a plurality of users to a machine learning model, as training data, the machine learning model being trained to predict a receptiveness of the user to the autonomous transportation services; and wherein the determining to omit causing the display of the request for permission to provide the autonomous transportation services is based at least in part on the receptiveness predicted by the machine learning model.

9. The method of claim 1, further comprising:

receiving a cancellation of the second transportation service after the instructing the first autonomous vehicle to begin providing the second transportation service; and matching a human-driven vehicle to provide the second transportation service.

10. The method of claim 9, further comprising:

receiving a third request for a third transportation service from the user device associated with the user;

matching a third autonomous vehicle to provide the third transportation service to the user;

receiving a third vehicle acceptance message indicating that the third autonomous vehicle has accepted the third transportation service; and after receiving the third vehicle acceptance message, causing display, on the user device, of the request for permission to provide the autonomous transportation service, the causing the display is at least in part based on the receiving the cancellation of the second transportation service.

11. A computing device comprising:

a processor; and a memory storing instructions that, when executed by the processor, configure the computing device to perform operations comprising:

receiving a first request for a first transportation service from a user device associated with a user;

matching a first autonomous vehicle to provide the first transportation service to the user;

receiving a first vehicle acceptance message indicating that the first autonomous vehicle has accepted the first transportation service;

after receiving the vehicle acceptance message, causing display, on the user device, of a request for permission to provide autonomous transportation services;

determining the permission is obtained from the user;

after determining that the permission is obtained from the user, instructing a first vehicle autonomy system of the first autonomous vehicle to begin providing the first transportation service, wherein the vehicle autonomy system physically controls at least one of braking, steering or throttle of the first autonomous vehicle to autonomously navigate to a pickup location associated with the first transportation service;

receiving a second request for a second transportation service from the user device;

matching a second autonomous vehicle to provide the second transportation service to the user;

accessing contextual user data from the user device associated with the user;

analyzing the contextual user data from the user device using a trained machine learning model trained to generate a prediction of receptiveness of the user to autonomous services;

determining to omit causing the display, on the user device, of the request for permission to provide the autonomous transportation services, the determination based on the prediction generated by the trained machine learning model; and in response to the determination to omit causing the display, instructing, by the hardware processor, a second vehicle autonomy system of the second autonomous vehicle to begin providing the second transportation service without waiting for user permission, wherein the second vehicle autonomy system physically controls at least one of braking, steering, or throttle of the second autonomous vehicle to autonomously navigate to a second pickup location associated with the second transportation service.

12. The computing device of claim 11, wherein the determining that the permission is obtained from the user is based on an elapse of a predetermined length of time after the causing the display of the request for permission.

13. The computing device of claim 11, wherein the operations further comprise:

accessing a transportation service history associated with the user, the transportation service history indicating the user has received transportation service executed by an autonomous vehicle; and wherein the determining to omit causing the display of the request for permission to provide the autonomous transportation services is based on the transportation service history.

14. The computing device of claim 13, wherein the transportation service history comprises past cancellations related to the autonomous transportation services.

15. The computing device of claim 11, wherein the user data comprises at least one of a current location of the user, a current time of day, and device characteristics of the user device.

16. The computing device of claim 15, wherein the user data comprises at least one of a transportation service history and a rating history.

17. The computing device of claim 11, wherein the determining to omit causing the display of the request for permission to provide the autonomous transportation services is based on a user location and a timing associated with the second transportation service.

18. The computing device of claim 11, wherein the operations further comprise:

inputting user data associated with a plurality of users to a machine learning model, as training data, the machine learning model being trained to predict a receptiveness of the user to the autonomous transportation services; and wherein the determining to omit causing the display of the request for permission to provide the autonomous transportation services is based at least in part on the receptiveness predicted by the machine learning model.

19. The computing device of claim 11, wherein the operations further comprise:

receiving a cancellation of the second transportation service after the instructing the first autonomous vehicle to begin providing the second transportation service; and matching a human-driven vehicle to provide the second transportation service.

20. A non-transitory computer-readable storage medium, the computer-readable storage medium including instructions that when executed by a computer, cause the computer to perform operations comprising:

receiving a first request for a first transportation service from a user device associated with a user;

matching a first autonomous vehicle to provide the first transportation service to the user;

receiving a first vehicle acceptance message indicating that the first autonomous vehicle has accepted the first transportation service;

after receiving the vehicle acceptance message, causing display, on the user device, of a request for permission to provide autonomous transportation services;

determining the permission is obtained from the user;

after determining that the permission is obtained from the user, instructing a first vehicle autonomy system of the first autonomous vehicle to begin providing the first transportation service wherein the vehicle autonomy system physically controls at least one of braking, steering or throttle of the first autonomous vehicle to autonomously navigate to a pickup location associated with the first transportation service;

receiving a second request for a second transportation service from the user device;

matching a second autonomous vehicle to provide the second transportation service to the user;

accessing contextual user data from the user device associated with the user;

analyzing the contextual user data from the user device using a trained machine learning model trained to generate a prediction of receptiveness of the user to autonomous services;

determining to omit causing the display, on the user device, of the request for permission to provide the autonomous transportation services, the determination based on the prediction generated by the trained machine learning model; and in response to the determination to omit causing the display, instructing a second vehicle autonomy system of the second autonomous vehicle to begin providing the second transportation service without waiting for user permission, wherein the second vehicle autonomy system physically controls at least one of braking, steering, or throttle of the second autonomous vehicle to autonomously navigate to a second pickup location associated with the second transportation service.

* * * * *